US012608599B2

(12) United States Patent
Ma et al.

(10) Patent No.: US 12,608,599 B2
(45) Date of Patent: Apr. 21, 2026

(54) DRIVING METHOD OF SYNAPSE CIRCUIT

(71) Applicant: TOHOKU UNIVERSITY, Miyagi (JP)

(72) Inventors: Yitao Ma, Miyagi (JP); Tetsuo Endoh, Miyagi (JP)

(73) Assignee: Tohoku University, Miyagi (JP)

( * ) Notice: Subject to any disclaimer, the term of this patent is extended or adjusted under 35 U.S.C. 154(b) by 1053 days.

(21) Appl. No.: 17/765,721

(22) PCT Filed: Oct. 1, 2020

(86) PCT No.: PCT/JP2020/037440
§ 371 (c)(1),
(2) Date: Oct. 6, 2022

(87) PCT Pub. No.: WO2021/066100
PCT Pub. Date: Apr. 8, 2021

(65) Prior Publication Data
US 2023/0013081 A1      Jan. 19, 2023

(30) Foreign Application Priority Data
Oct. 2, 2019      (JP) ................................ 2019-182549

(51) Int. Cl.
*G06F 7/00* (2006.01)
*G06N 3/049* (2023.01)
*G06N 3/063* (2023.01)
(52) U.S. Cl.
CPC ............. *G06N 3/063* (2013.01); *G06N 3/049* (2013.01)
(58) Field of Classification Search
CPC ................................ G06N 3/063; G06N 3/049

USPC ...................................... 707/600–899; 706/15
See application file for complete search history.

(56) References Cited

U.S. PATENT DOCUMENTS

2017/0286827 A1*  10/2017  Chen ...................... G06N 3/063
2018/0107922 A1    4/2018  Paul et al.

FOREIGN PATENT DOCUMENTS

JP          2013111200          5/2015
JP          2019189895          7/2021

OTHER PUBLICATIONS

Tanaka, Hideki et al. "A CMOS Spiking Neural Network Circuit with Symmetric/Asymmetric STDP Function." IEICE Trans. Fundam. Electron. Commun. Comput. Sci. 92-A (2009): 1690-1698.

(Continued)

*Primary Examiner* — Isaac M Woo
(74) *Attorney, Agent, or Firm* — Fox Rothschild LLP; Carol E. Thorstad-Forsyth

(57) ABSTRACT

Provided is a simplified driving method of a synapse circuit. In a case where a first pre-spike pulse precedes a first post-spike pulse, a second pre-spike pulse from an input circuit is used as a time window that allows writing of a coupling weight, and the first post-spike pulse from a neuron circuit is used as a write pulse for controlling a write timing of the coupling weight. In a case where the first post-spike pulse precedes the first pre-spike pulse, a second post-spike pulse from the neuron circuit is used as the time window, and the first pre-spike pulse from the input circuit is used as the write pulse. The second pre-spike pulse and the second post-spike pulse are output in synchronization with the first pre-spike pulse and the first post-spike pulse, respectively.

11 Claims, 22 Drawing Sheets

(56) References Cited

OTHER PUBLICATIONS

S. P. Adhikari, H. Kim, R. K. Budhathoki, C. Yang and L. O. Chua, "A Circuit-Based Learning Architecture for Multilayer Neural Networks With Memristor Bridge Synapses," in IEEE Transactions on Circuits and Systems I: Regular Papers, vol. 62, No. 1, pp. 215-223, Jan. 2015, doi: 10.1109/TCSI.2014.2359717.

M. Chu et al., "Neuromorphic Hardware System for Visual Pattern Recognition With Memristor Array and CMOS Neuron," in IEEE Transactions on Industrial Electronics, vol. 62, No. 4, pp. 2410-2419, Apr. 2015, doi: 10.1109/TIE.2014.2356439.

G. W. Burr et al., "Large-scale neural networks implemented with non-volatile memory as the synaptic weight element: Comparative performance analysis (accuracy, speed, and power)," 2015 IEEE International Electron Devices Meeting (IEDM), 2015, pp. 4.4.1-4.4.4, doi: 10.1109/IEDM.2015.7409625.

First Office Action issued in corresponding Korean Patent Application No. 10-2022-7014230, dated Dec. 3, 2024 with machine translation (17 pages).

Narasimman et al., "A Low-voltage, Low power STDP Synapse implementation using Domain-Wall Magnets for Spiking Neural Networks," ISCAS 2016—IEEE International Symposium on Circuits and Systems, pp. 914-917 (2016).

* cited by examiner

FIG. 20

DRIVING METHOD OF SYNAPSE CIRCUIT

CROSS-REFERENCES TO RELATED APPLICATION

This application is a U.S. National Stage entry under 35 U.S.C. § 371 based on International Application No. PCT/JP2020/037440 which was filed on Oct. 1, 2020 and claims priority to Japanese Patent Application No. 2019-182549, which was filed on Oct. 2, 2019. The contents of the priority applications are hereby incorporated herein in their entirety by reference.

TECHNICAL FIELD

The present invention relates to a driving method of a synapse circuit.

BACKGROUND ART

There is known a neural network that performs information processing on a computer by using a brain system of a living body as a model. In addition, in order to realize a neural network by using a semiconductor element or the like, research on the constituent elements and circuits has been advanced. Various models of neural network circuit devices have been proposed. For example, in one model, neurons are coupled to each other via a synapse circuit, the synapse circuit is allowed to have a synaptic coupling weight representing the strength of the coupling, and when an integrated value of a voltage of a pulse input from another neuron to one neuron and the coupling weight reaches a predetermined threshold value, the neuron fires, and the pulse is transmitted to the next neuron.

In a neural network, when a synaptic coupling weight is stored in a synapse circuit, for example, learning based on a synapse model having spike timing dependent synaptic plasticity (hereinafter, referred to as STDP) is performed. In the STDP, a synaptic coupling weight based on a time difference between a pulse from a pre-neuron circuit connected to a previous stage of the synapse circuit and a pulse from a post-neuron circuit connected to a subsequent stage of the synapse circuit is stored in the synapse circuit.

On the other hand, as a non-volatile memory element, there is known, for example, a resistive random access memory (ReRAM), a phase change memory (phase change random access memory), or the like having a resistive memory element of which electric resistance is changed by an electric field induced giant resistance change. There is known a neural network circuit device that stores a synaptic coupling weight in such a non-volatile memory element (refer to, for example, Non-Patent Literatures 1 to 3).

CITATION LIST

Non-Patent Literature

Non-Patent Literature 1: G. W. Burr, P. Narayanan, R. M. Shelby, S. Sidler, I. Boybat, C. di Nolfo, and Y. Leblebici, IEDM, pp. 4.4.1-4.4.4, 2015.
Non-Patent Literature 2: M. Chu; B. Kim; S. Park; H. Hwang; M. Jeon; B.-H. Lee; B.-G. Lee, IEEE Trans. IE, Vol. 62, Issue 4, pp. 2410-2419, 2015.
Non-Patent Literature 3: S. P. Adhikari; H. Kim; R. K. Budhathoki; C. Yang; L. O. Chua, IEEE Trans. CAS, Vol. 62, Issue 1, pp. 215-223, 2015.

SUMMARY OF INVENTION

Technical Problem

As described above, when the learning based on the STDP is performed, it is necessary to write the synaptic coupling weight of the synapse circuit according to an order and a time difference of each pulse. Control for the writing is complicated, and there are problems such as an increase in power consumption and an increase in a scale of the circuit. Therefore, a simplified driving method for storing the synaptic coupling weight is desired.

In view of the above circumstances, an object of the invention is to provide a simplified driving method of a synapse circuit.

Solution to Problem

In order to achieve the above object, according to the invention, there is provided a driving method of a synapse circuit. The synapse circuit includes a weight storage unit that stores one of a first coupling weight and a second coupling weight as a synaptic coupling weight. The synapse circuit is connected between a pre-neuron circuit and a post-neuron circuit. The synapse circuit is configured to output, to the post-neuron circuit, a weighted pre-spike pulse obtained by weighting a pre-spike pulse input from the pre-neuron circuit with the synaptic coupling weight and write the synaptic coupling weight based on a pulse time difference and an order of the pre-spike pulse and the post-spike pulse that is output from the post-neuron circuit. The driving method includes: inputting, from one of the pre-neuron circuit and the post-neuron circuit to the synapse circuit, a first time window pulse that defines a first time window that allows writing of the synaptic coupling weight to the weight storage unit in a case where the pre-spike pulse precedes the post-spike pulse, and inputting, from the other one of the pre-neuron circuit and the post-neuron circuit to the synapse circuit, a first write pulse having a pulse width smaller than that of the first time window pulse, the first write pulse being a write timing of writing the synaptic coupling weight of the weight storage unit; inputting, from one of the pre-neuron circuit and the post-neuron circuit to the synapse circuit, a second time window pulse that defines a second time window that allows writing of the synaptic coupling weight to the weight storage unit in a case where the post-spike pulse precedes the pre-spike pulse, and inputting, from the other one of the pre-neuron circuit and the post-neuron circuit to the synapse circuit, a second write pulse having a pulse width smaller than that of the second time window pulse, the second write pulse being a write timing of writing the synaptic coupling weight of the weight storage unit; and performing a write operation by the weight storage unit when the first time window pulse and the first write pulse are simultaneously input to the synapse circuit and when the second time window pulse and the second write pulse are simultaneously input to the synapse circuit.

Advantageous Effects of Invention

According to the invention, in a case where the post-spike pulse precedes the pre-spike pulse and a case where the pre-spike pulse precedes the post-spike pulse, the time window pulse that allows writing of the synaptic coupling weight is input from one of the pre-neuron circuit and the post-neuron circuit to the synapse circuit, a short write pulse which is the write timing of writing the synaptic coupling weight to the weight storage unit is input from the other one to the synapse circuit, and the weight storage unit performs the write operation when the time window pulse and the write pulse are simultaneously input to the synapse circuit. Accordingly, it is possible to simplify driving for storing the synaptic coupling weight based on a STDP.

BRIEF DESCRIPTION OF DRAWINGS

FIG. 20 is a circuit diagram illustrating an example in which a current signal is output as a weighted pre-spike pulse.

4

Figure 23:
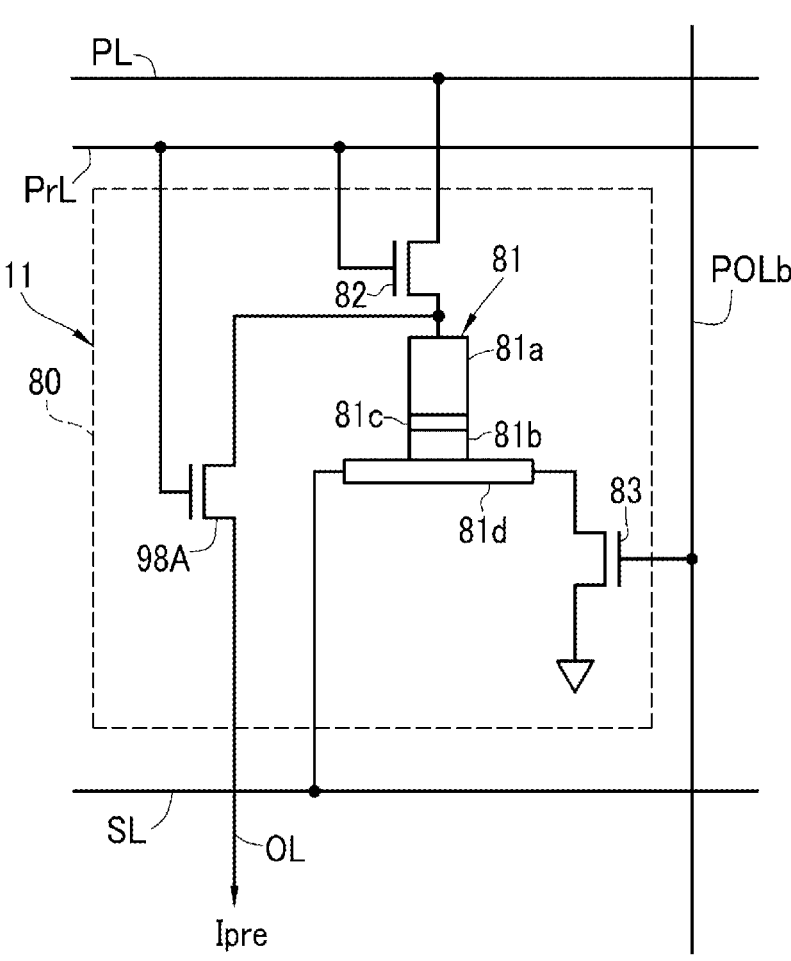

FIG. 23 is a circuit diagram illustrating an example in which the weight storage unit using the three-terminal MTJ element outputs the current signal as the weighted pre-spike pulse.

Figure 24:
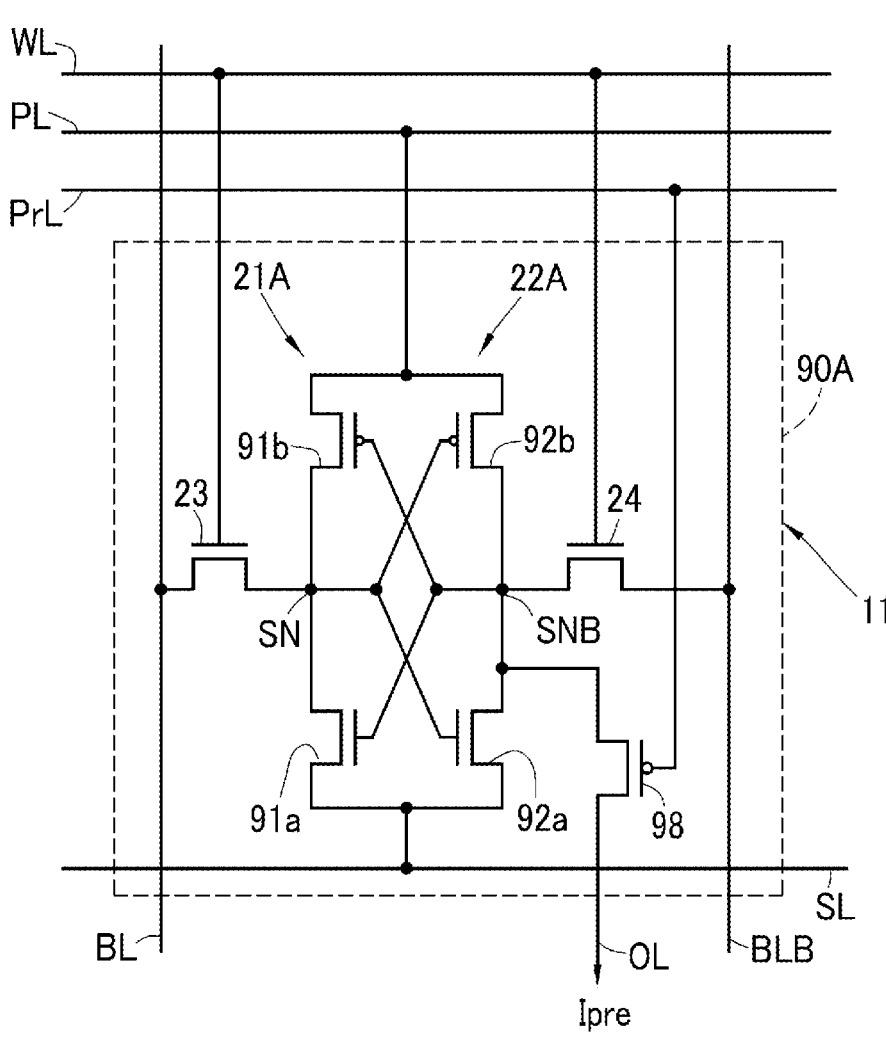

FIG. 24 is a circuit diagram illustrating an example in which the weight storage unit configured with the SRAM outputs the current signal as the weighted pre-spike pulse.

Figure 25:
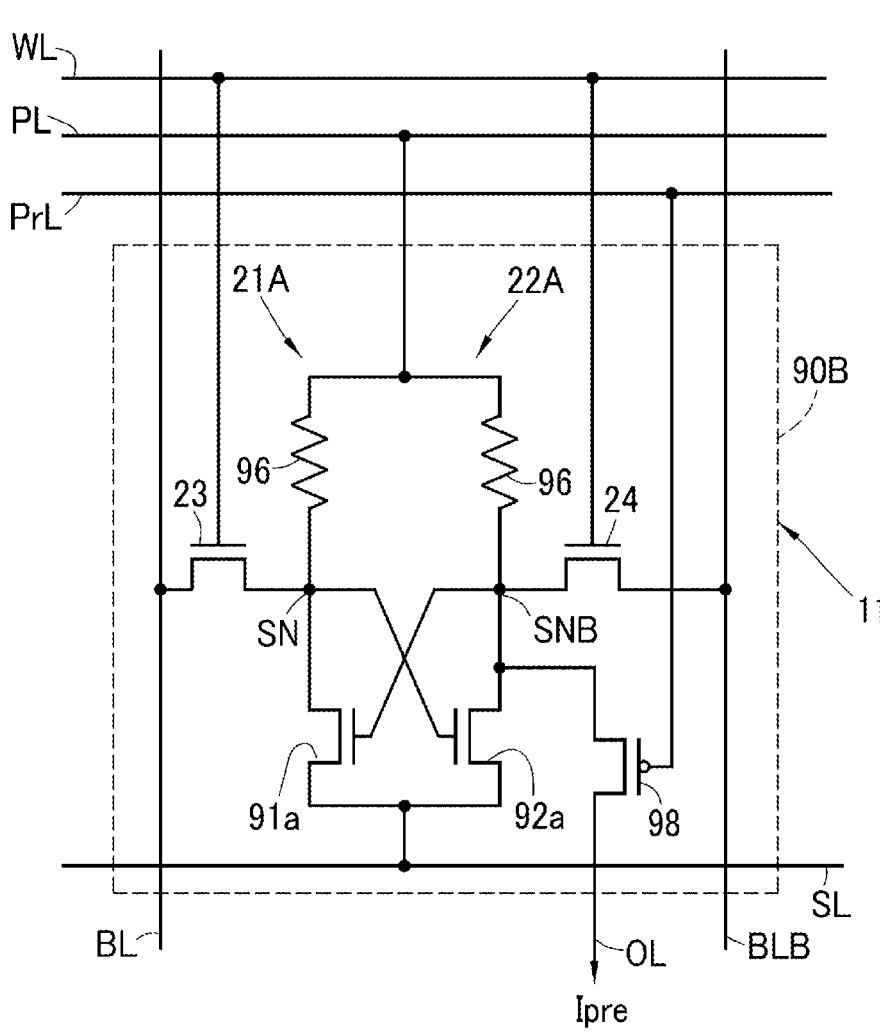

FIG. 25 is a circuit diagram illustrating another example in which the weight storage unit configured with the SRAM outputs the current signal as the weighted pre-spike pulse.

DESCRIPTION OF EMBODIMENTS

First Embodiment

Figure 1:
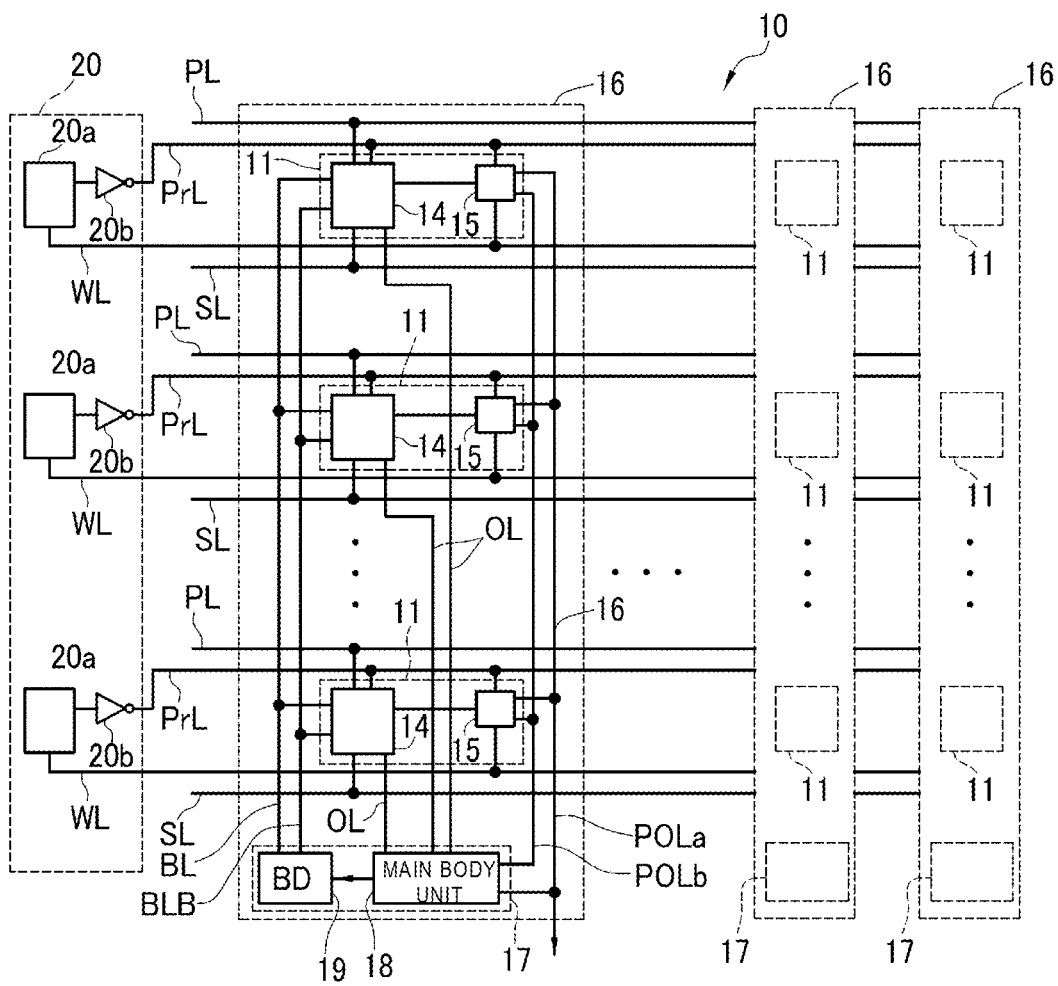
FIG. 1 is a block diagram illustrating an outline of a neural network circuit device of a first embodiment.

In FIG. 1, a neural network circuit device 10 according to a first embodiment is provided with a plurality of synapse circuits 11 arranged in a matrix. Each synapse circuit 11 has a weight storage unit 14 and a selection unit 15. The neural network circuit device 10 is further provided with a plurality of neuron circuits 17. The plurality of synapse circuits 11 are provided corresponding to the respective neuron circuits 17. In this example, each column 16 of the synapse circuits 11 is provided with the neuron circuit 17 at the end in the column direction (vertical direction in FIG. 1), and one column of the synapse circuits 11 corresponds to one neuron circuit 17. The neuron circuit 17 has a main body unit 18 and a bit line driver 19.

Corresponding to each column 16 of the synapse circuits 11, bit lines BL and BLB, a first post-spike line POLa, and a second post-spike line POLb are provided to extend in the column direction. The bit lines BL and BLB are connected to each weight storage unit 14 and the bit line driver 19 in the column 16 to which the bit lines correspond. The first post-spike line POLa and the second post-spike line POLb are connected to each selection unit 15 and the main body unit 18 in the column 16 to which the post-spike lines correspond. An output line OL is provided for each weight storage unit 14, and each weight storage unit 14 is connected to the main body unit 18 of the neuron circuit 17 in the column 16, in which the weight storage unit 14 is arranged, by the respective output line OL.

Corresponding to each row of the synapse circuits 11, a power source line PL that supplies a power source voltage to the weight storage unit 14, a grounded source line SL, a pre-spike line PrL, and a word line WL are provided to extend in the row direction (left and right direction in the drawing). The power source line PL, the source line SL, and the pre-spike line PrL are connected to the weight storage units 14 in the corresponding rows. The pre-spike lines PrL and the word lines WL are connected to the selection units 15 in the corresponding rows. The voltage supplied from the power source line PL is about half ($=|\Delta VB|/2$) of the magnitude of a bit line potential difference $\Delta VB$ generated between the bit line BL and the bit line BLB as described later. An input circuit 20a is provided in a preceding stage 20 for each row. The pre-spike line PrL of each row is connected to the input circuit 20a via an inverter 20b, and the word line WL is directly connected to the input circuit 20a.

The neural network circuit device 10 refers to a synapse model having spike timing dependent synaptic plasticity (hereinafter, referred to as STDP). In the neural network circuit device 10, the input circuit 20a is provided as a pre-neuron circuit and corresponds to a pre-neuron. The neuron circuit 17 is provided as a post-neuron circuit and corresponds to a post-neuron. The input circuit 20a outputs a first pre-spike pulse as the pre-spike pulse, and the neuron circuit 17 outputs a first post-spike pulse as the post-spike pulse. The first pre-spike pulse is output at a timing corresponding to the firing timing of the pre-neuron, and the first post-spike pulse is output at a timing corresponding to the firing timing of the post-neuron. In addition, the synapse circuit 11 corresponds to the synapse that synapse-couples the pre-neuron and the post-neuron, and stores a synaptic coupling weight (hereinafter, simply referred to as the coupling weight).

In the case of paying attention to one synapse, the STDP is a property that the coupling weight with the synapse located between the pre-neuron and the post-neuron changes depending on the timing at which each of the pre-neuron and the post-neuron connected before and after the synapse fires and outputs a spike pulse. In each of a case where the first pre-spike pulse precedes the first post-spike pulse and a case where the first pre-spike pulse follows the first post-spike pulse, the neural network circuit device 10 updates the coupling weight of the synapse circuit 11 in a case where a pulse time difference $\Delta T$ between the first post-spike pulse and the first pre-spike pulse is within a preset specified time Tw. In this example, the synapse circuit 11 stores a first coupling weight as the coupling weight in a case where the former of the first pre-spike pulse and the first post-spike pulse precedes, and stores a second coupling weight as the coupling weight when the latter precedes.

In the following description, the pulse time difference $\Delta T$ is defined as a magnitude of a time difference between the first post-spike pulse and the first pre-spike pulse. In a case of distinguishing between positive and negative, the pulse time difference $\Delta T$ is defined as positive in a case where the first pre-spike pulse precedes the first post-spike pulse, and is defined as negative in a case where the first post-spike pulse precedes the first pre-spike pulse.

Figure 2:
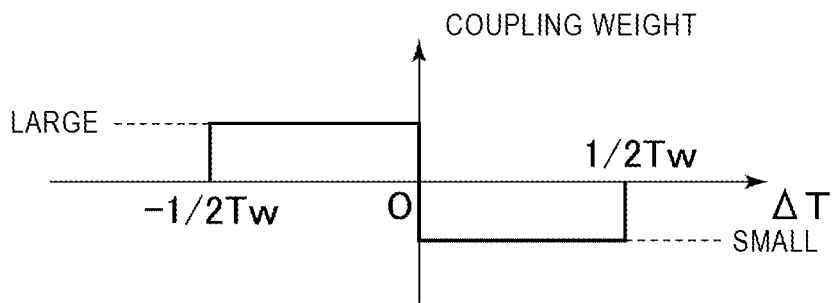
FIG. 2 is a graph showing a relationship between a pulse time difference ΔT between a first post-spike pulse and a first pre-spike pulse and a coupling weight.

In this example, the weighted level of the first coupling weight is relatively large, and the weighted level of the second coupling weight is relatively small. That is, as shown in FIG. 2, in a case where the first pre-spike pulse is input to the synapse circuit 11 during a period of time Tw tracking back from the time when the first post-spike pulse is output, with reference to a timing at which the first post-spike pulse is output from the neuron circuit 17 to which the synapse circuit 11 is connected, the coupling weight of the synapse circuit 11 becomes a large first coupling weight; and in a case where the first pre-spike pulse is input to the synapse circuit 11 during a period of time Tw from the time when the first post-spike pulse is output, the coupling weight of the synapse circuit 11 becomes a small second coupling weight. Therefore, this example is different from the general symmetric STDP and asymmetric STDP in which the coupling weight is gradually increased or gradually decreased by increasing the pulse time difference $\Delta T$ in the case of updating the coupling weight.

The neural network circuit device 10 has a recognition mode and a learning mode. The recognition mode is a mode in which an output from each neuron circuit 17 as a processing result according to the result of image recognition is obtained, for example, by inputting a signal corresponding to an image to be processed such as the image recognition from the preceding stage 20 to the neural network circuit device 10, and the coupling weight stored in each synapse circuit 11 in the learning mode is used. The learning mode is an operation mode in which the coupling weight stored in each synapse circuit 11 is updated by inputting a signal based on a prepared image from the preceding stage 20 to the neural network circuit device 10.

The input circuit 20a of the preceding stage 20 includes a pulse generator that generates the first pre-spike pulse and a second pre-spike pulse synchronized with the first pre-spike pulse, and outputs the first pre-spike pulse to the pre-spike line PrL and outputs the second pre-spike pulse to the word line WL. In this example, the first pre-spike pulse in the synapse circuit 11 is low active, and the first pre-spike pulse from the input circuit 20a is output to the pre-spike line PrL via the inverter 20b. The first pre-spike pulse is output in both the recognition mode and the learning mode, while the second pre-spike pulse is output only in the learning mode.

In the learning mode, the first pre-spike pulse also functions as a second write pulse used to control the write timing of the coupling weight in a case where the first post-spike pulse precedes the first pre-spike pulse. The pulse width of the first pre-spike pulse is smaller than that of the second pre-spike pulse. As will be described later, in a configuration in which a weight is stored in the weight storage unit 14 using the MTJ element, the pulse width of the first pre-spike pulse can be set to 10 nsec or less.

In the learning mode, the second pre-spike pulse is used as a time window that allows writing of the coupling weight to the synapse circuit 11 in a case where the first pre-spike pulse precedes the first post-spike pulse, and is a first time window pulse in this example. Writing is allowed while the second pre-spike pulse is being input to the synapse circuit 11. The second pre-spike pulse has the same pulse width as the specified time Tw. In this example, the output of the second pre-spike pulse is started simultaneously with the output of the first pre-spike pulse, and the output of the second pre-spike pulse may also be delayed from the first pre-spike pulse. In a case where the output of the second pre-spike pulse is delayed from the first pre-spike pulse, a timing of generating a second post-spike pulse and a timing of changing a potential of the bit line BL/BLB, which will be described later, are also delayed in the same manner.

In the learning mode, the first post-spike pulse output from the neuron circuit 17 also functions as a first write pulse used to control the write timing of the coupling weight in a case where the first pre-spike pulse precedes the first post-spike pulse. The pulse width of the first post-spike pulse is smaller than that of the second pre-spike pulse. Similarly to the first pre-spike pulse, in the configuration in which the weight is stored in the weight storage unit 14 using the MTJ element, the pulse width of the first post-spike pulse can be set to 10 nsec or less.

The second post-spike pulse is output from the neuron circuit 17 in synchronization with the first post-spike pulse. In this example, the output of the second post-spike pulse is started simultaneously with the output of the first post-spike pulse. In the learning mode, the second post-spike pulse is used as a time window that allows the writing of the coupling weight to the synapse circuit 11 in a case where the first post-spike pulse precedes the first pre-spike pulse, and is a second time window pulse in this example. Similarly to the second pre-spike pulse, the writing is allowed while the second post-spike pulse is being input to the synapse circuit 11. The second pre-spike pulse has the same pulse width as the specified time Tw.

As will be described later, the synapse circuit 11 performs an operation of writing the coupling weight when the second post-spike pulse and the first pre-spike pulse are simultaneously input and when the first post-spike pulse and the second pre-spike pulse are simultaneously input.

In response to the input of the first pre-spike pulse, the weight storage unit 14 of the synapse circuit 11 outputs a voltage signal Vpre as a weighted pre-spike pulse weighted by the stored coupling weight via the output line OL to the main body unit 18 of the neuron circuit 17.

The main body unit 18 of the neuron circuit 17 generates the first post-spike pulse in respond to the fact that the sum of the voltage levels of the voltage signals Vpre from the respective weight storage units 14 in the column 16 in which the main body unit 18 is arranged becomes equal to or more than a predetermined threshold value. In the recognition mode, the main body unit 18 outputs the first post-spike pulse to the first post-spike line POLa, and in the learning mode, the main body unit 18 outputs the first post-spike pulse and outputs the second post-spike pulse synchronized with the first post-spike pulse to the second post-spike line POLb. The first post-spike pulse is sent to, for example, a synapse circuit provided between the neuron circuit 17 and the next-stage neuron circuit.

In the learning mode, the bit line driver 19 of the neuron circuit 17 controls the potentials of the bit lines BL and BLB in synchronization with the generation of the first post-spike pulse of the main body unit 18 in the same neuron circuit 17. Specifically, at the same time as the first post-spike pulse, during a period substantially equal to the pulse width of the first post-spike pulse, the bit line driver 19 sets a potential VB1 of the bit line BL to be higher than a potential VB2 of the bit line BLB (setting the bit line potential difference ΔVB (=VB1−VB2) to be positive), and then allows a current to flow from the bit line BL toward the bit line BLB via the weight storage unit 14; and thereafter, the bit line driver 19 sets the potential VB2 of the bit line BLB to be higher than the potential VB1 of the bit line BL (setting the bit line potential difference ΔVB to be negative) to allow a current to flow from the bit line BLB toward the bit line BL via the weight storage unit 14. The bit line potential difference ΔVB is set to 0 V when the specified time Tw elapses from the generation of the first post-spike pulse. In this example, the potentials of the bit lines BL and BLB in a case where the bit line potential difference ΔVB is positive are the first potential, and the potentials of the bit lines BL and BLB in a case where the bit line potential difference ΔVB is negative are the second potential.

In the learning mode, the selection unit 15 of the synapse circuit 11 generates a selection signal on the basis of the first pre-spike pulse, the second pre-spike pulse, the first post-spike pulse, and the second post-spike pulse when the pulse time difference ΔT between the first post-spike pulse and the first pre-spike pulse is within the specified time Tw. The weight storage unit 14 stores the coupling weight based on the potential difference between the bit lines BL and BLB at the timing when the selection signal is input.

Figure 3:
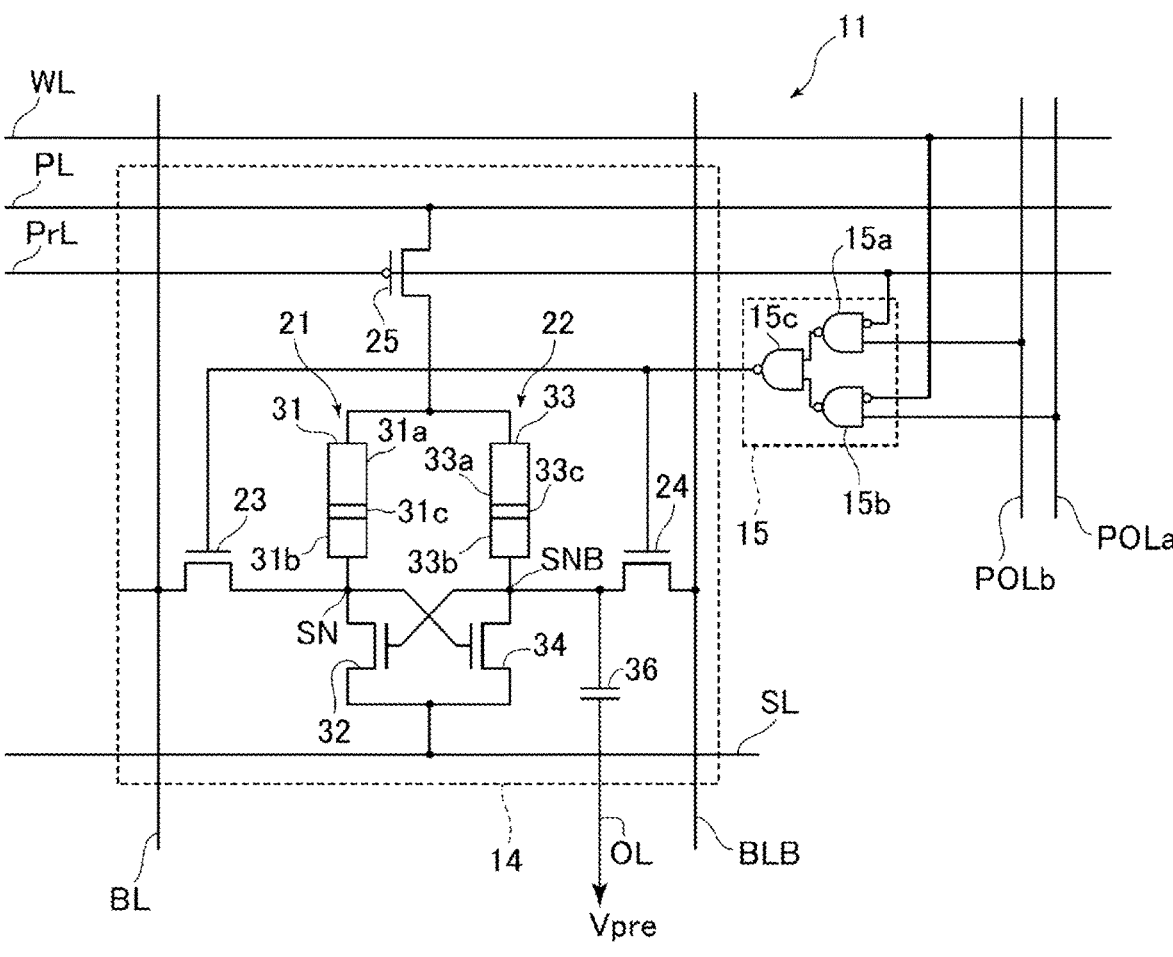
FIG. 3 is a circuit diagram illustrating a configuration of a synapse circuit.

As illustrated in FIG. 3, the weight storage unit 14 of the synapse circuit 11 includes inverters 21 and 22, a pair of MOS transistors 23 and 24 as transfer gates, and a MOS transistor 25. The inverter 21 is configured with a MTJ element (magnetic tunnel junction element) 31 and a MOS transistor 32 which are connected in series, and the inverter 22 is configured with a MTJ element 33 and a MOS transistor 34 which are connected in series. The MOS transistors 23, 24, 32, 34 are N-type MOSFETs, and the MOS transistor 25 is a P-type MOSFET. In this example, the MOS transistors 32 and 34 are inverter MOS transistors.

The MTJ element 31 has a structure in which a magnetization fixed layer 31a and a magnetization free layer 31b are stacked with an insulating film 31c interposed therebetween. The magnetization direction of the magnetization fixed layer 31a is fixed. The magnetization free layer 31b can change the magnetization direction by allowing a write current of a predetermined threshold value or more to flow in the MTJ element 31, and the magnetization direction is determined by the direction of the write current. As is well known, the MTJ element 31 becomes a low resistor having a low resistance in the parallel state where the magnetization directions of the magnetization fixed layer 31a and the magnetization free layer 31b are the same, and the MTJ element 31 becomes a high resistor having a high resistance in the antiparallel state where the magnetization directions thereof are opposite. The MTJ element 31 is brought into a parallel state by allowing the write current to flow in the direction from the magnetization fixed layer 31a to the magnetization free layer 31b and is brought into an antiparallel state by allowing the write current to flow in the opposite direction.

The MTJ element 33 also has a configuration in which a magnetization fixed layer 33a, a magnetization free layer 33b, and an insulating film 33c are stacked, and similarly to the MTJ element 31, the magnetization direction of the magnetization free layer 33b can be changed by the write current, so that the resistance value changes in the parallel and antiparallel states.

The weight storage unit 14 stores the coupling weight in a non-volatile manner by the MTJ elements 31 and 33. When one of the MTJ elements 31 and 33 is in a parallel state, the other is in an antiparallel state. In this example, in a case where the first coupling weight is stored, the MTJ element 31 is in an antiparallel state and the MTJ element 33 is in a parallel state, and in a case where the second coupling weight is stored, the MTJ element 31 is in a parallel state and the MTJ element 33 is in an antiparallel state. The MTJ elements 31 and 33 are advantageous elements from the viewpoint that high-speed rewriting is possible, the maximum number of times of rewriting is considerably large and the number of times of learning can be increased as compared with other ReRAMs, phase change memories, or the like.

The inverter 21 is connected to the magnetization free layer 31b of the MTJ element 31 and the drain of the MOS transistor 32, and the inverter 22 is connected to the magnetization free layer 33b of the MTJ element 33 and the drain of the MOS transistor 34. The magnetization fixed layers 31a and 33a of the MTJ elements 31 and 33 are connected to the power source line PL via the MOS transistor 25. The sources of the MOS transistors 32 and 34 are grounded via the source line SL.

A connection node SN between the MTJ element 31 which is the output terminal of the inverter 21 and the MOS transistor 32 is connected to the gate of the MOS transistor 34 which is the input terminal of the inverter 22, and a connection node SNB between the MTJ element 33 which is the output terminal of the inverter 22 and the MOS transistor 34 is connected to the gate of the MOS transistor 32 which is the input terminal of the inverter 21. Therefore, the inverters 21 and 22 are cross-coupled to constitute a flip-flop, and the MOS transistors 32 and 34 constitute a differential pair.

The connection node SN is connected to the bit line BL via the MOS transistor 23, and the connection node SNB is connected to the bit line BLB via the MOS transistor 24. The gates of the MOS transistors 23 and 24 are connected to the selection unit 15 and is turned on or off by a selection signal from the selection unit 15. The selection unit 15 and the MOS transistors 23 and 24 constitute a writing unit.

In a case where the MOS transistors 23 and 24 are turned on when the bit line potential difference ΔVB is positive, the write current flows in a path from the bit line BL through the connection node SN, the MTJ element 31, the MTJ element 33, and the connection node SNB toward the bit line BLB, so that the MTJ element 31 is in an antiparallel state and the MTJ element 33 is in a parallel state. Conversely, in a case where the MOS transistors 23 and 24 are turned on when the bit line potential difference ΔVB is negative, the write current flows in a path from the bit line BLB through the connection node SNB, the MTJ element 33, the MTJ element 31, and the connection node SN toward the bit line BL, so that the MTJ element 31 is in the parallel state and the MTJ element 33 is in the antiparallel state.

The potential (voltage) of the connection node SNB is output to the output line OL as the voltage signal Vpre via a capacitor 36 as an output circuit unit. That is, one electrode of the capacitor 36 is connected to the connection node SNB, and the other electrode is connected to the main body unit 18 of the neuron circuit 17 via the output line OL. As will be described later, the capacitor 36 is connected to a control gate CG (refer to FIG. 4) in the main body unit 18. The capacitor 36 is provided in order to prevent generation of a conduction current between the weight storage units 14 of the synapse circuits 11 capacitively coupled to the same floating gate FG (refer to FIG. 4) via the control gate CG. As the capacitor 36, for example, a MOS capacitor using a gate capacitance of a transistor may be used.

The substantial coupling capacitance between the weight storage unit 14 and the floating gate FG is determined by the capacitance of the capacitor 36 and the coupling capacitance of the control gate CG to the floating gate FG. In addition, the weight storage unit 14 and the floating gate FG may also be allowed to have different substantial coupling capacitances, and by doing so, for example, the weighting can be applied to the voltage signal Vpre. Further, the output circuit unit may be connected to the connection node SN instead of the connection node SNB.

The MOS transistor 25 is a switching element used for power gating in the recognition mode, and is a switching element as a reading unit that is used for driving a signal, that is, outputting the voltage signal Vpre. The MOS transistor 25 is turned on when the gate is connected to the pre-spike line PrL and the first pre-spike pulse as an input signal is being output. When the MOS transistor 25 is turned on, the inverters 21 and 22, that is, the MOS transistors 32 and 34 constituting the differential pair are operated by receiving a power supply from the power source line PL. Therefore, in response to the first pre-spike pulse, the voltage of the connection node SNB, which is the output terminal of the inverter 22, is output to the output line OL as the voltage signal Vpre. The voltage signal Vpre is relatively high in a case of the first coupling weight, that is, in a case where the MTJ element 31 is in the antiparallel state and the MTJ element 33 is in the parallel state, and is relatively low in a case of the second coupling weight, that is, in a case where the MTJ element 31 is in the parallel state and the MTJ element 33 is in the antiparallel state.

The selection unit 15 sets the selection signal to be active (H level) by using a combination of logic circuits 15a to 15c when the first pre-spike pulse is output while the second post-spike pulse is being output, or when the second pre-spike pulse is output while the first post-spike pulse is being output. Therefore, the selection signal becomes active and the MOS transistors 23 and 24 are turned on only in a case where the pulse time difference ΔT between the first post-spike pulse and the first pre-spike pulse is within the specified time Tw.

Figure 4:
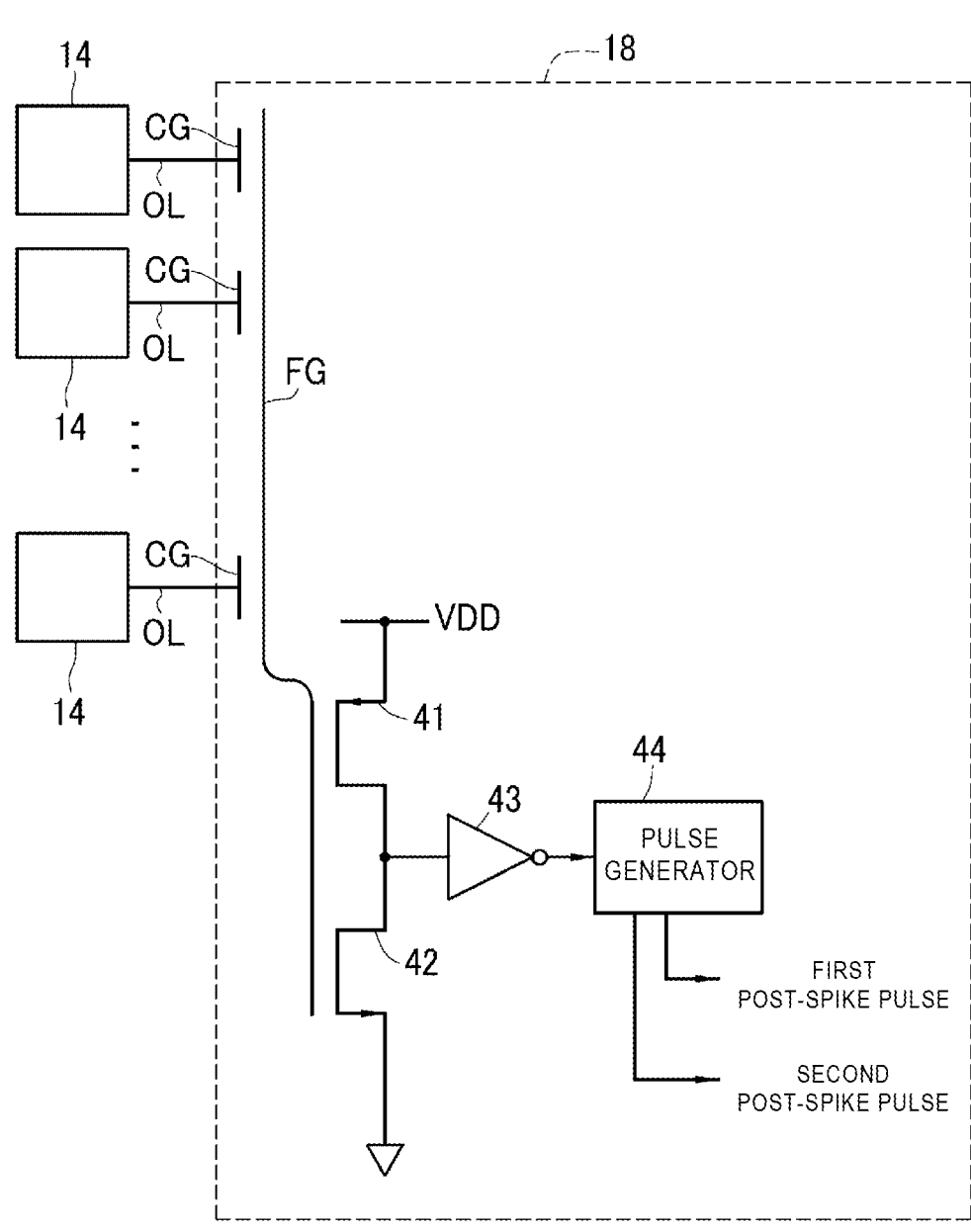
FIG. 4 is a block diagram illustrating an example of a main configuration of a main body unit of a neuron circuit.

As illustrated in FIG. 4 as an example, the main body unit 18 includes a MOS transistor 41 that is a P-type MOSFET, a MOS transistor 42 that is an N-type MOSFET, an inverter 43, and a pulse generator 44. The pulse generator 44 generates the first post-spike pulse and the second post-spike pulse. In addition, as the pulse generator 44 of the main body unit 18, a pulse generator which can control pulse waveform, output timing, delay time, and the like can be used to generate the first post-spike pulse and the second post-spike pulse.

The MOS transistors 41 and 42 as the neuron MOS transistors are connected in series to constitute an inverter. That is, the drains of the MOS transistors 41 and 42 are connected to each other, the source of the MOS transistor 41 is connected to a power source (voltage VDD), and the source of the MOS transistor 42 is grounded. The inverter 43 has an input terminal connected to a connection node between the MOS transistor 41 and the MOS transistor 42, and thus, when the connection node becomes the ground potential (0 V), the output logic is inverted from a L level to a H level. The pulse generator 44 generates the first post-spike pulse and the second post-spike pulse in response to the fact that the output of the inverter 43 changes from the L level to the H level.

The MOS transistors 41 and 42 share the floating gate FG. In addition, the MOS transistors 41 and 42 are provided with a plurality of control gates CG that are capacitively coupled to the floating gate FG. The control gate CG of the main body unit 18 is provided corresponding to each weight storage unit 14 of the column 16 in which the main body unit 18 is arranged, and the output line OL from the corresponding weight storage unit 14 is connected to the control gate CG. The MOS transistors 41 and 42 are controlled to be turned on or off by the potential of the floating gate FG, and when one is turned on, the other is turned off.

The potential of the floating gate FG is determined by the voltage of the voltage signal Vpre applied to each control gate CG and the coupling capacitance between each control gate CG and the floating gate FG. In this example, the coupling capacitance of each control gate CG to the floating gate FG is the same. Therefore, the MOS transistors 41 and 42 can be controlled by the sum of the voltages applied to the respective control gates CG so that one of the MOS transistors 41 and 42 is turned on and the other of the MOS transistors 41 and 42 is turned off. The main body unit 18 may generate the first post-spike pulse and the second post-spike pulse based on the sum of the voltages of the voltage signals Vpre from the respective synapse circuits 11 to which the main body unit 18 is connected.

Figure 5:
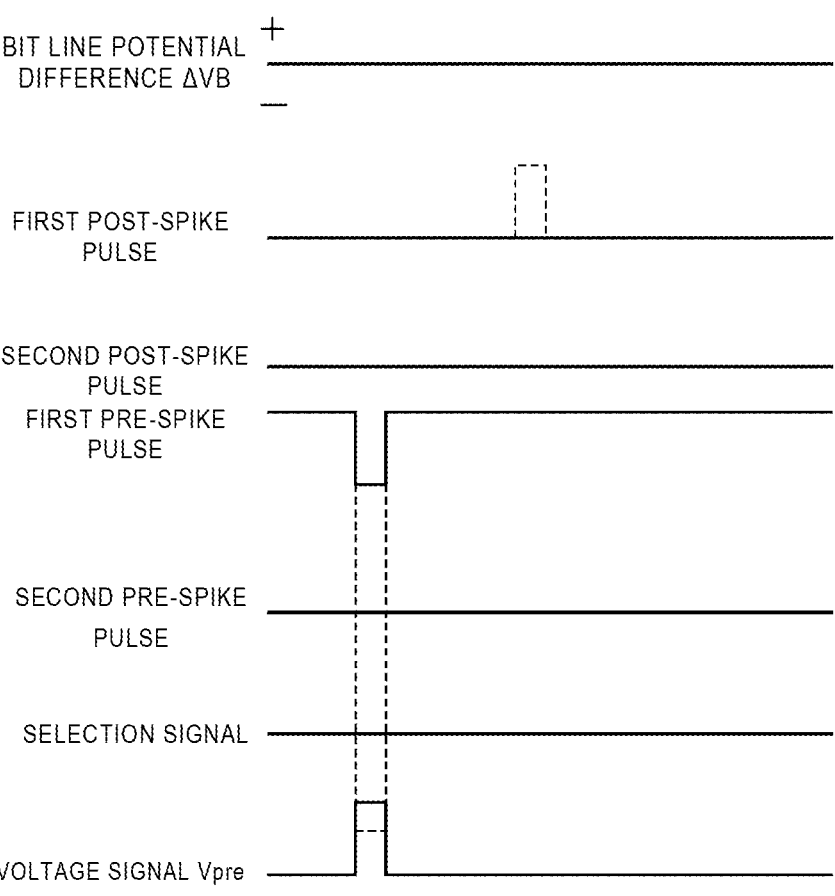
FIG. 5 is a timing chart illustrating various signals in a recognition mode.

Next, the operation of the above-described configuration will be described. In the recognition mode, as illustrated in FIG. 5, at a timing according to the contents of the processing of the preceding stage 20, the first pre-spike pulse is output to the pre-spike line PrL from each input circuit 20a via the inverter 20b. In addition, in the recognition mode, since the second pre-spike pulse is not output, the selection unit 15 does not output the selection signal.

With attention paid to one synapse circuit 11, when the first pre-spike pulse is input to this synapse circuit 11 via the pre-spike line PrL to which the synapse circuit 11 is connected, the MOS transistor 25 in the weight storage unit 14 is turned on. When the MOS transistor 25 is turned on, a current from the power source line PL flows in the MTJ element 31 and the MTJ element 33, and thus, the inverters 21 and 22 are operated. As described above, in the recognition mode, the weight storage unit 14 is effective in reducing power consumption since the current flows only while the MOS transistor 25 is turned on.

For example, in a case where the coupling weight stored in the synapse circuit 11 is the first coupling weight, that is, in a case where the MTJ element 31 has a high resistance and the MTJ element 33 has a low resistance, a potential difference occurs in which the potential of the connection node SNB is higher than the potential of the connection node SN. The potential difference is amplified by the operation of the cross-coupled inverters 21 and 22 and becomes stable in a state where the potential difference is large. Conversely, in a case where the coupling weight stored in the synapse circuit 11 is the second coupling weight, that is, in a case where the MTJ element 31 has a low resistance and the MTJ element 33 has a high resistance, a potential difference occurs in which the potential of the connection node SNB is lower than the potential of the connection node SN, and the potential difference is amplified by the operation of the cross-coupled inverters 21 and 22 and becomes stable in a state where the potential difference is large.

Since the potential difference between the connection node SN and the connection node SNB is amplified and becomes stable by the differential pair of the MOS transistors 32 and 34, the time required for the stabilization is fairly short. Therefore, high speed operation becomes possible.

The current flowing in the MTJ elements 31 and 33 when the MOS transistor 25 is turned on is adjusted to a magnitude that does not change the magnetization state. Actually, while the current flows, there is a change in the magnetization direction of the magnetization free layers 31b and 33b, but the change is fairly small to a degree that the generation of a desired potential difference at the connection nodes SN and SNB is not affected. The slight magnetization direction of the magnetization free layers 31b and 33b returns to the original magnetization direction by stopping the current.

As described above, the potentials of the connection nodes SN and SNB change according to the coupling weight stored in the synapse circuit 11. As a result, in a case where the synapse circuit 11 stores the first coupling weight, the voltage signal Vpre having a high voltage is output to the output line OL connected to the connection node SNB via the capacitor 36, and in a case where the second coupling weight is stored, the voltage signal Vpre having a low voltage is output. The voltage signal Vpre from the synapse circuit 11 is applied to the control gate CG of the main body unit 18 via the output line OL. In addition, when the MOS transistor 25 is turned off, the capacitor 36 discharges and the voltage of the voltage signal Vpre drops. However, since the capacitor 36 discharges through the MTJ elements 31 and 33, the MOS transistors 32 and 34, or the like, the voltage of the voltage signal Vpre is gradually decreased and does not immediately reach 0 V.

With attention paid to one neuron circuit 17, the voltage of the voltage signal Vpre output from each synapse circuit 11 in the column 16 where the neuron circuit 17 is arranged is applied to the corresponding control gate CG. Of course, no voltage is applied to the control gate CG from the synapse circuit 11 to which the first pre-spike pulse is not input. As described above, when the voltage of the voltage signal Vpre is applied to each control gate CG and the potential of the floating gate FG reaches the threshold value, the MOS transistor 41 is turned off, and the MOS transistor 42 is turned on. As a result, the output of the inverter 43 is inverted from the L level to the H level, and the first post-spike pulse is output from the pulse generator 44. When the potential of the floating gate FG does not reach the threshold value, the MOS transistor 41 is not turned off, and the MOS transistor 42 is not turned on, so that the first post-spike pulse is not output.

As described above, according to the timing of the first pre-spike pulse output from the preceding stage 20 to the pre-spike line PrL of each row and the coupling weight stored in each synapse circuit 11, the first post-spike pulse is output from the neuron circuit 17 provided for each column 16. The first post-spike pulse in the recognition mode is sent to, for example, the synapse circuit provided between neuron circuit 17 and the next-stage neuron circuit.

In the recognition mode, the weighted level applied to the pre-spikes is transmitted from the weight storage unit 14 to the main body unit 18 as the magnitude of the voltage of the voltage signal Vpre, and the sum of the voltages is obtained by the capacitively coupled control gate CG and floating gate FG. For this reason, without providing an arithmetic circuit for calculating the product sum of the coupling weights and the pre-spike pulses, the first post-spike pulse corresponding to the post-spike pulse according to the result of the product sum calculation can be obtained.

In addition, since only a fairly small current for charging the control gate CG (actually, the capacitor 36) flows, the operation at low power is possible. In addition, in the weight storage unit 14, the two MTJ elements 31 and 33 are always written with the resistance states opposite to each other. For this reason, when the voltage signal Vpre is output, a current flows in one (low resistance) of the MTJ elements, and almost no current flows in the other (high resistance) of the MTJ elements. The direction of the current flowing in the one (low resistance) MTJ element is the direction of the write current that allows the MTJ element to have a low resistance. Therefore, in either the MTJ element having a high resistance or the MTJ element having a low resistance, the read disturb in which the direction of magnetization is reversed by the current flowing when the voltage signal Vpre is output does not occur.

Next, the learning mode will be described. In the learning mode, similarly to the recognition mode, the first pre-spike pulse is output to the pre-spike line PrL from each input circuit 20a at a timing according to the content of the processing of the preceding stage 20. Also in the learning mode, when the first pre-spike pulse is output, similarly to the case of the recognition mode, the weight storage unit 14 operates, and the voltage signal Vpre is output.

Figure 6:
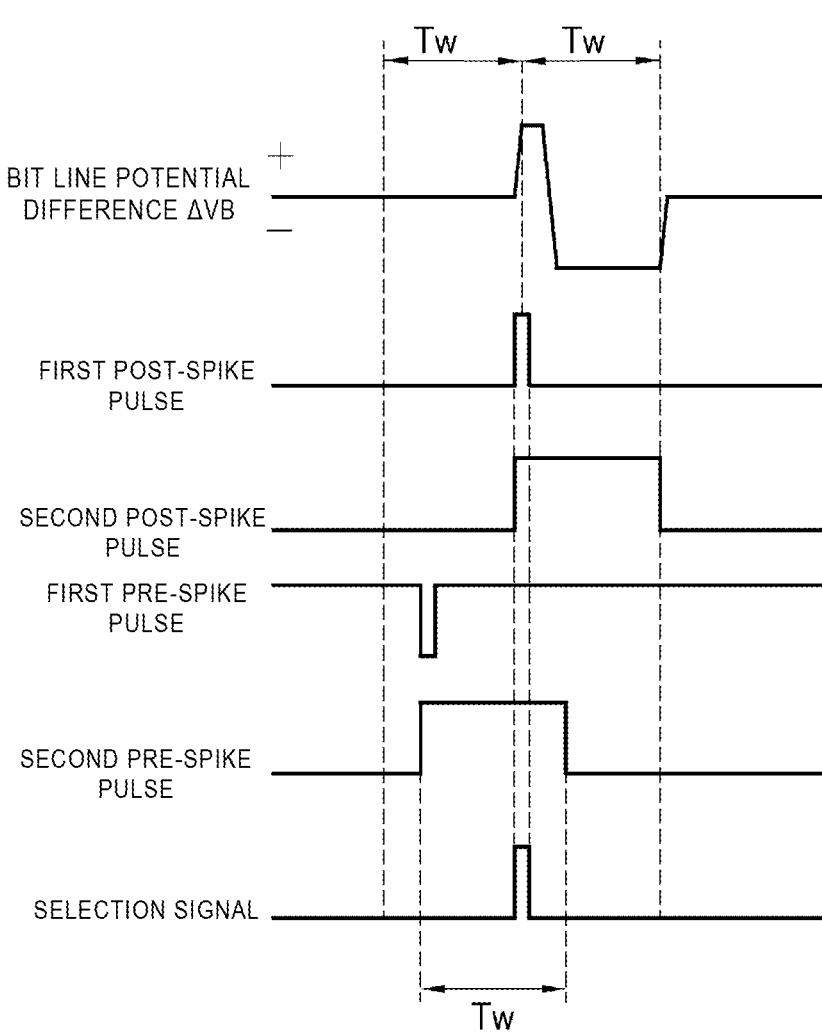
FIG. 6 is a timing chart illustrating various signals in a learning mode in a case where the first pre-spike pulse precedes.
Figure 7:
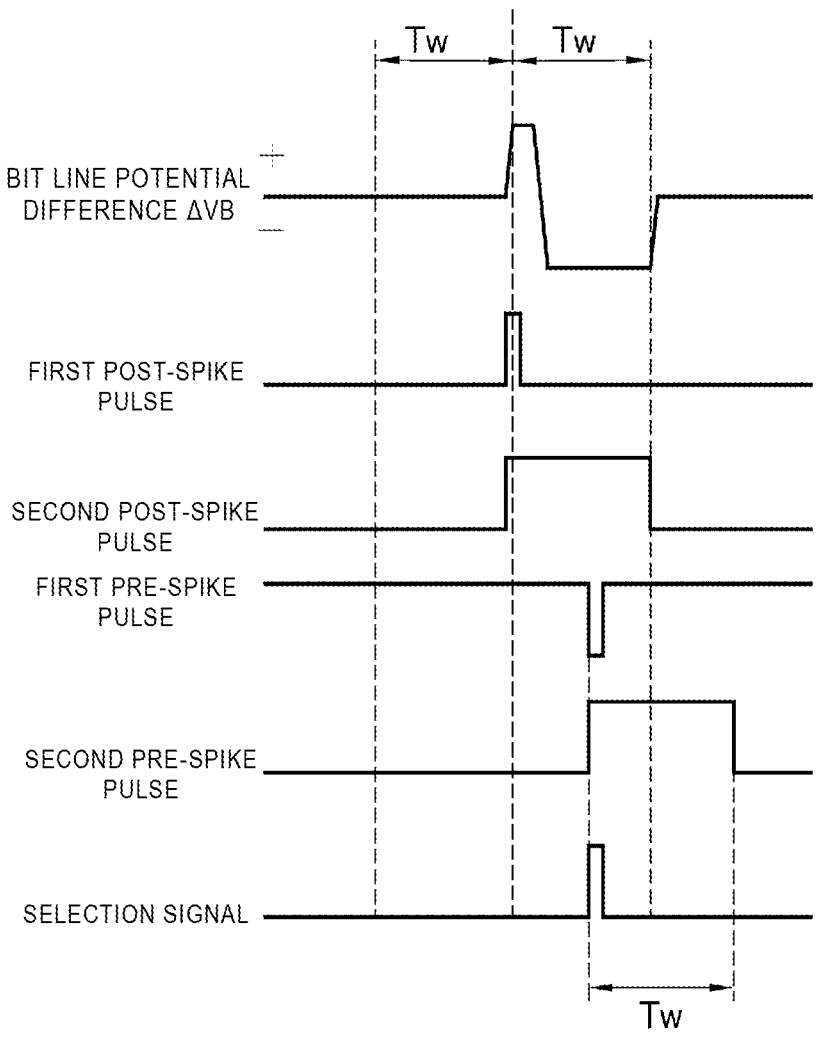
FIG. 7 is a timing chart illustrating various signals in a learning mode in a case where the first post-spike pulse precedes.

In this learning mode, as illustrated in FIGS. 6 and 7, the second pre-spike pulse having a pulse width Tw is output from the input circuit 20a to the word line WL in synchronization with the first pre-spike pulse. In addition, FIG. 6 illustrates the case where the first pre-spike pulse precedes the first post-spike pulse, and FIG. 7 illustrates the case where the first post-spike pulse precedes the first pre-spike pulse, both of which illustrate a case where the pulse time difference ΔT between the first pre-spike pulse and the first post-spike pulse is within the specified time Tw.

Similarly to the recognition mode, the synapse circuit 11, to which the first pre-spike pulse is input via the pre-spike line PrL, outputs the voltage signal Vpre corresponding to the coupling weight stored in the weight storage unit 14 of the synapse circuit 11 to the main body unit 18 arranged in the same column 16. Also in the main body unit 18, when the voltage of the voltage signal Vpre is applied to the control gate CG and the potential of the floating gate FG reaches the threshold value, the MOS transistor 41 is turned off, and the MOS transistor 42 is turned on. As a result, the first post-spike pulse is output from the pulse generator 44 to the first post-spike line POLa. In addition, the second post-spike pulse having a pulse width Tw is output from the main body unit 18 to the second post-spike line POLb in synchronization with the first post-spike pulse.

At the same time as the output of the first post-spike pulse, the bit line driver 19 sets the bit line potential difference ΔVB to be positive during a period substantially the same as the pulse width of the first post-spike pulse, and then sets the bit line potential difference ΔVB to be negative. Thereafter, the bit line potential difference ΔVB is set to 0 V when the specified time Tw elapses from the generation of the first post-spike pulse.

As described above, the output of the second pre-spike pulse is started simultaneously with the output of the first pre-spike pulse, and the second pre-spike pulse has the same pulse width as the specified time Tw. For this reason, for example, as illustrated in FIG. 6, when the first pre-spike pulse is input to the synapse circuit 11 within a period that is tracked back by the time Tw from the timing at which the first post-spike pulse is output, the first post-spike pulse is input to the selection unit 15 of the synapse circuit 11 while the second pre-spike pulse is input. As a result, substantially at the same time as the first post-spike pulse, the selection signal is output from the selection unit 15 to the weight storage unit 14, and the MOS transistors 23 and 24 in the weight storage unit 14 are turned on during the period when the bit line potential difference ΔVB is positive.

When the MOS transistors 23 and 24 are turned on as described above, the potential of the bit line BL is higher than that of the bit line BLB, so that the write current flows in a path from the bit line BL through the MOS transistor 23, the MTJ element 31, the MTJ element 33, and the MOS transistor 24 toward the bit line BLB. Accordingly, the MTJ element 31 has a high resistance, and the MTJ element 33 has a low resistance. As a result, the synapse circuit 11 is in a state where the first coupling weight is stored.

When the pulse time difference ΔT is equal to or less than the specified time Tw and the first pre-spike pulse precedes the first post-spike pulse, as described above, the MOS transistor 25 is turned on at the same time as the MOS transistors 23 and 24. On the other hand, the voltage of the power source line PL is set to about |ΔVB|/2 as described above. For this reason, even if the MOS transistor 25 is turned on at the same time as the MOS transistors 23 and 24, a potential difference is generated between the bit line BL and the power source line PL and between the power source line PL and the bit line BLB, so that the write current flows as described above, and thus, a state where the first coupling weight is stored by the MTJ elements 31 and 33 is obtained.

On the other hand, the output of the second post-spike pulse is started simultaneously with the output of the first post-spike pulse, and the second post-spike pulse has the same pulse width as the specified time Tw. Therefore, as illustrated in FIG. 7, when the first pre-spike pulse is input to the synapse circuit 11 within a period from the time of the output of the first post-spike pulse to the time when the specified time Tw elapses, the first pre-spike pulse is input to the selection unit 15 of the synapse circuit 11 while the second post-spike pulse is input. As a result, since the selection signal is output from the selection unit 15 to the weight storage unit 14 substantially at the same time as the first pre-spike pulse, during a period when the bit line potential difference ΔVB is negative, the MOS transistors 23 and 24 in the weight storage unit 14 are turned on.

When the MOS transistors 23 and 24 are turned on as described above, the potential of the bit line BLB is higher than that of the bit line BL, so that the write current flows in a path from the bit line BLB through the MOS transistor 24, the MTJ element 33, the MTJ element 31, and the MOS transistor 23 toward the bit line BL. Therefore, the MTJ element 31 has a low resistance, and the MTJ element 33 has a high resistance. As a result, the synapse circuit 11 is in a state where the second coupling weight is stored.

When the first pre-spike pulse precedes the first post-spike pulse over the time Tw, the first post-spike pulse is input to the selection unit 15 to which the second pre-spike pulse is not input. When the first post-spike pulse precedes the first pre-spike pulse over the time Tw, the first pre-spike pulse is input to the selection unit 15 to which the second post-spike pulse is not input. In these cases, since the selection signal is not generated, the weight storage unit 14 does not perform the operation of writing the coupling weight.

Each synapse circuit 11 rewrites the coupling weight as described above, and when the first pre-spike pulse is input after the rewriting, the synapse circuit 11 outputs the voltage signal Vpre corresponding to the new coupling weight to the neuron circuit 17 as described above. In addition, when the potential of the floating gate FG reaches the threshold value, the neuron circuit 17 outputs the first post-spike pulse and the second post-spike pulse as described above. Then, when the first pre-spike pulse is input within each period of the time Tw before and after the timing when the first post-spike pulse is input, each synapse circuit 11 rewrites the coupling weight again. As described above, the coupling weight of each synapse circuit 11 is updated, and the final coupling weight is held in each synapse circuit 11.

As described above, in the learning mode, the magnetization states of the MTJ elements 31 and 33 are changed by allowing the write current to flow. However, since the time (hereinafter, rewriting time) required to change the MTJ elements 31 and 33 between the parallel state and the antiparallel state is fairly short, a high speed operation is possible. For example, the rewriting time of the MTJ elements 31 and 33 is about ¹⁄₁₀ of that of the ReRAM.

As described above, in either the recognition mode or the learning mode, the neural network circuit device 10 can operate at a high speed and low power and has a relatively optimal configuration. In a case where the first pre-spike pulse precedes the first post-spike pulse, the time window that allows writing of the coupling weight is defined by the second pre-spike pulse from the input circuit 20a as the first time window pulse, and in a case where the first post-spike pulse precedes the first pre-spike pulse, the time window that allows writing of the coupling weight is defined by the second post-spike pulse from the neuron circuit 17 as the second time window pulse; in a case where the first pre-spike pulse precedes the first post-spike pulse, the control of the write timing of the coupling weight is defined by the first post-spike pulse from the neuron circuit 17 as a first write control pulse, and in a case where the first post-spike pulse precedes the first pre-spike pulse, the control of the write timing of the coupling weight is defined by the first pre-spike pulse from the input circuit 20a as a second write control pulse. Therefore, driving of the synapse circuit based on the STDP can be simplified. Further, the driving based on the STDP can be implemented with a simple circuit configuration.

The coupling weight stored in the synapse circuit may be a binary coupling weight that is any of a first coupling weight having a relatively large weighted level or a second coupling weight having a relatively small weighted level or may be a multi-valued coupling weight that is any of three or more coupling weights having different weighted levels.

In a case where the coupling weight stored in the synapse circuit is multi-valued, for example, each synapse circuit is provided with a plurality of (for example, M) storage units including a weight storage unit and a selection unit, and as described above, each weight storage unit stores any of the first coupling weight and the second coupling weight. The pulse widths of the second post-spike pulses input to the selection units in one synapse circuit are set to be different from each other within the time Tw (Tw is a specified time), and similarly, the pulse widths of the second pre-spike pulse are set to be different from each other within the time Tw (Tw is a specified time). Therefore, the number of weight storage units to which the selection signal is input increases or decreases according to the length of the pulse time difference ΔT between the first post-spike pulse and the first pre-spike pulse.

With attention paid to one synapse circuit, in a case where the first pre-spike pulse precedes the first post-spike pulse, the smaller the pulse time difference ΔT, the larger the number of weight storage units in which the first coupling weight is written, and the larger the pulse time difference ΔT, the smaller the number of weight storage units in which the first coupling weight is written. On the contrary, in a case where the first post-spike pulse precedes the first pre-spike pulse, the smaller the pulse time difference ΔT, the larger the number of weight storage units in which the second coupling weight is written, and the larger the pulse time difference ΔT, the smaller the number of weight storage units in which the second coupling weight is written. As a result, one synapse circuit can store M+1 types of coupling weights corresponding to the state in which the first coupling weight is stored in the 0 to M weight storage units (the second coupling weight is stored in the weight storage unit that does not store the first coupling weight).

Also in this case, each weight storage unit outputs a voltage or a current corresponding to the stored coupling weight to the main body unit when the first pre-spike pulse as the input signal is output. In response to the input of the first pre-spike pulse, each voltage or each current corresponding to the coupling weight stored in each weight storage unit is output from one synapse circuit to the main body unit. Since the main body unit operates on the basis of the sum of input voltages or currents, the main body unit also operates on the basis of the sum of voltages or currents from one synapse circuit, and as a result, any of the M+1 types of coupling weights stored in the synapse circuit is output to the main body unit.

Second Embodiment

In a second embodiment, control of a time window is performed by only a signal from a pre-neuron circuit side, and control of a write timing of a coupling weight is performed by only a signal from a post-neuron circuit side. The second embodiment is similar to the first embodiment except for the following detailed description, the substantially same members are denoted by the same reference numerals, and detailed description thereof is omitted.

Figure 8:
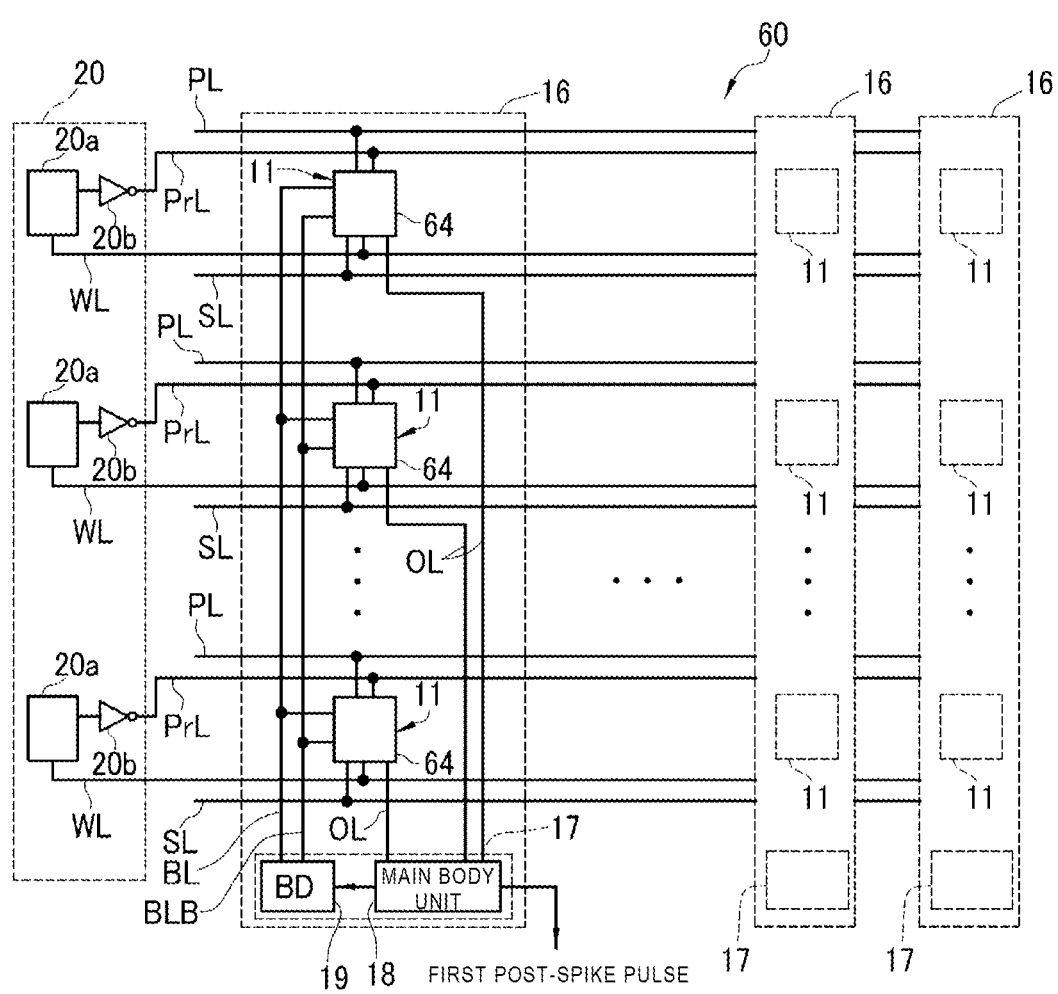
FIG. 8 is a block diagram illustrating an outline of a neural network circuit device of a second embodiment.

In FIG. 8, a neural network circuit device 60 according to the second embodiment has a similar configuration as the neural network circuit device according to the first embodiment, and the first and second post-spike lines are not provided. The main body unit 18 of the neuron circuit 17 sends the first post-spike to only the synapse circuit provided between the neuron circuit 17 and the next-stage neuron circuit. The main body unit 18 does not output the second post-spike.

In the learning mode, the bit line driver 19 controls the potentials of the bit lines BL and BLB to set the bit line potential difference ΔVB to be positive in a pulsed manner at the same time as the first post-spike pulse and at substantially the same time as the pulse width of the first post-spike pulse, and set the bit line potential difference ΔVB to be negative in a pulsed manner after the elapse of the time Tw from the generation of the first post-spike pulse and at substantially the same time as the pulse width of the first post-spike pulse. In this example, a positive change of the pulsed bit line potential difference ΔVB functions as the first write pulse, and a negative change of the pulsed bit line potential difference ΔVB functions as the second write pulse.

The synapse circuit 11 is configured only with a weight storage unit 64. The power source line PL, the source line SL, the bit lines BL and BLB, the pre-spike line PrL, and the word line WL are connected to the weight storage unit 64.

Figure 9:
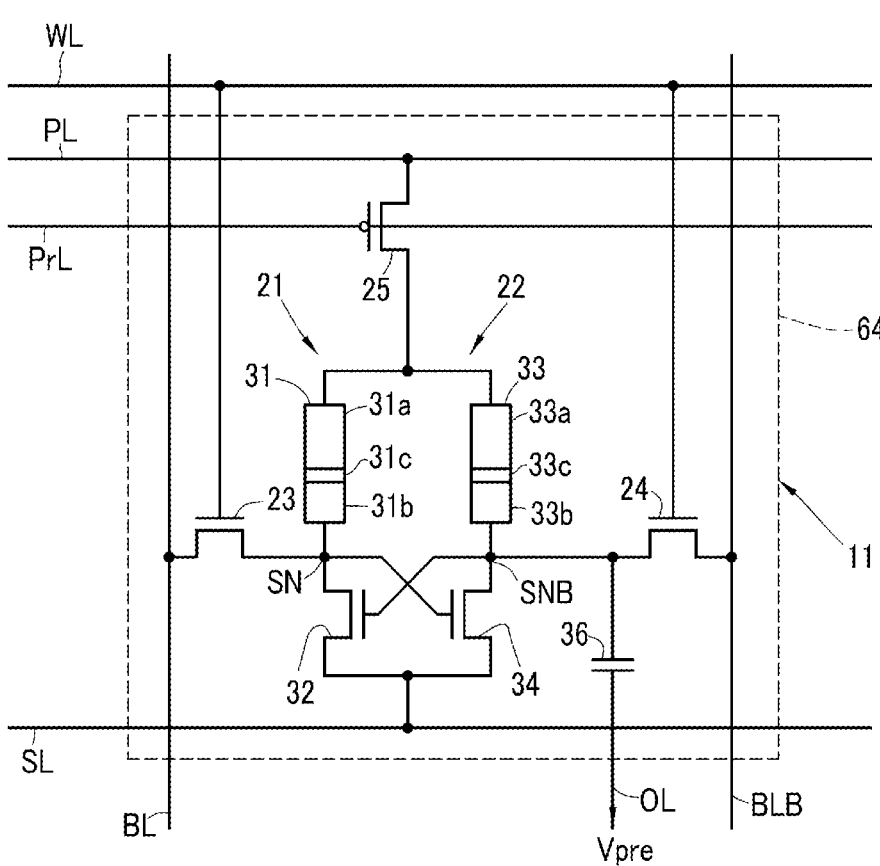
FIG. 9 is a circuit diagram illustrating a configuration of a synapse circuit of the second embodiment.

As shown in FIG. 9, in the weight storage unit 64, gates of the MOS transistors 23 and 24 constituting the weight storage unit 64 are connected to the word line WL. Therefore, the MOS transistors 23 and 24 are turned on while the second pre-spike pulse is being output. The configuration of the weight storage unit 64 is the same as that of the weight storage unit of the first embodiment except for the connection of the MOS transistors 23 and 24. The operation of the weight storage unit 64 and the operation of the neural network circuit device 60 in the recognition mode are the same as those in the first embodiment.

In the neural network circuit device 60 configured as described above, the second pre-spike pulse from the input circuit as the pre-neuron circuit defines a time window in a case where the first pre-spike pulse precedes the first post-spike pulse and a time window in a case where the first post-spike pulse precedes the first pre-spike pulse. Therefore, in this example, the second pre-spike pulse is a common time window pulse.

Figure 10:
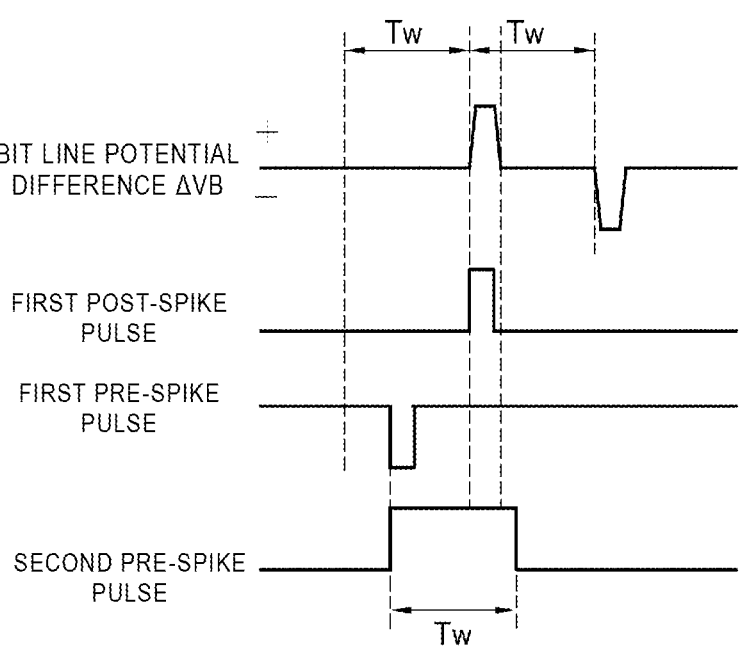
FIG. 10 is a timing chart illustrating various signals in a learning mode in a case where a first pre-spike pulse in the second embodiment precedes.
Figure 11:
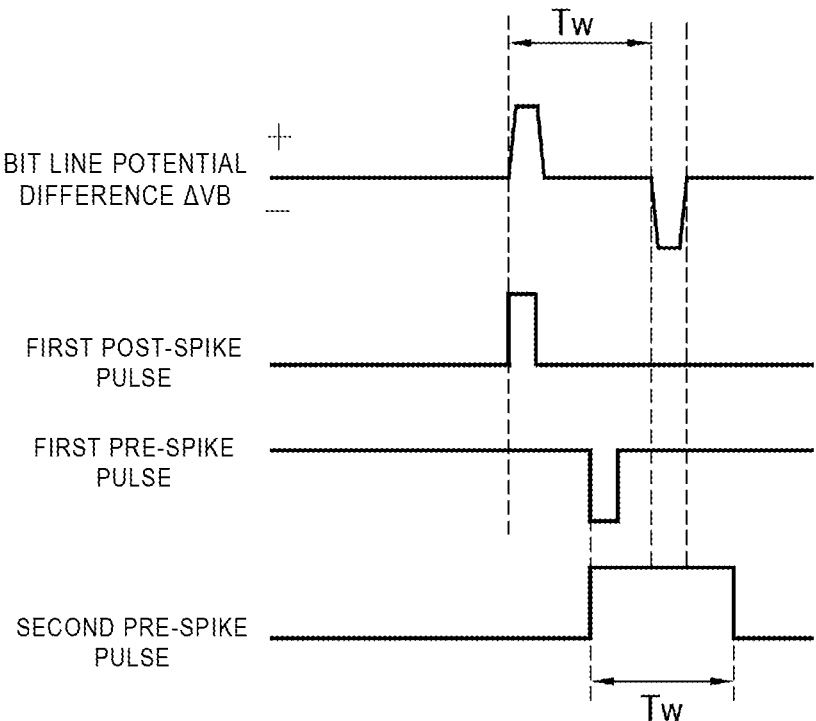
FIG. 11 is a timing chart illustrating various signals in a learning mode in a case where a first post-spike pulse in the second embodiment precedes.

As shown in FIGS. 10 and 11, in the learning mode, at the same time as the generation of the first post-spike pulse from the main body unit 18, the bit line driver 19 sets the bit line potential difference ΔVB to be positive for substantially the same time as the pulse width of the first post-spike pulse, and then sets the bit line potential difference ΔVB to be "0 V". Thereafter, when the time Tw elapses from the generation of the first post-spike pulse, the bit line potential difference ΔVB is set to be negative for substantially the same time as the pulse width of the first post-spike pulse, and then is set to be "0 V".

The pulse width of the second pre-spike pulse output at the same time as the first pre-spike pulse is the time Tw. Therefore, for example, as shown in FIG. 10, in a case where the first pre-spike pulse precedes the first post-spike pulse and the pulse time difference ΔT between the first pre-spike pulse and the first post-spike pulse is within the specified time Tw, the bit line potential difference ΔVB is positive during a period when the MOS transistors 23 and 24 are turned on by the second pre-spike pulse. As a result, the write current flows in a path from the bit line BL through the MOS transistor 23, the MTJ element 31, the MTJ element 33, and the MOS transistor 24 toward the bit line BLB. Therefore, the MTJ element 31 has a high resistance, the MTJ element 33 has a low resistance, and the weight storage unit 64 is in a state where the first coupling weight is stored.

The pulse width of the second pre-spike pulse output at the same time as the first pre-spike pulse is the time Tw, and the bit line potential difference ΔVB is negative with a delay of the time Tw from the first post-spike pulse. Therefore, for example, as shown in FIG. 11, in a case where the first post-spike pulse precedes the first pre-spike pulse and the pulse time difference ΔT between the first post-spike pulse and the first pre-spike pulse is within the specified time Tw, the bit line potential difference ΔVB is negative during the period when the MOS transistors 23 and 24 are turned on by the second pre-spike pulse. As a result, the write current flows in a path from the bit line BLB through the MOS transistor 24, the MTJ element 33, the MTJ element 31, and the MOS transistor 23 toward the bit line BL. Therefore, the MTJ element 31 has a low resistance, the MTJ element 33 has a high resistance, and the synapse circuit 11 is in a state where the second coupling weight is stored.

In a case where the first pre-spike pulse precedes the first post-spike pulse over the time Tw and in a case where the first post-spike pulse precedes the first pre-spike pulse over the time Tw, the bit line potential difference ΔVB is positive or negative outside a period when the second pre-spike pulse is input to the weight storage unit 64. Therefore, in this case, the weight storage unit 64 does not perform the operation of writing the coupling weight.

In the second embodiment, the time window that allows the writing of the coupling weight is defined by the second pre-spike pulse from the input circuit 20a as the common time window pulse, and the control of the writing timing of the coupling weight is defined by the positive change of the pulsed bit line potential difference ΔVB as the first write pulse and the negative change of the pulsed bit line potential difference ΔVB as the second write pulse. Therefore, the driving of the synapse circuit based on the STDP can be simplified. Further, the driving based on the STDP can be implemented with a simple circuit configuration.

Third Embodiment

In a third embodiment, contrary to the second embodiment, control of a time window is performed by only a signal from a post-neuron circuit side, and control of a writing timing of a coupling weight is performed by only a signal from a pre-neuron circuit side. As will be described in detail below, this embodiment is the same as the second embodiment except that the change of the bit line potential difference ΔVB by the bit line driver and the pulse width of the second pre-spike pulse are different. The neural network circuit device and the synapse circuit are illustrated in FIGS. 8 and 9, the substantially same members are denoted by the same reference numerals, and detailed description thereof is omitted.

Figure 12:
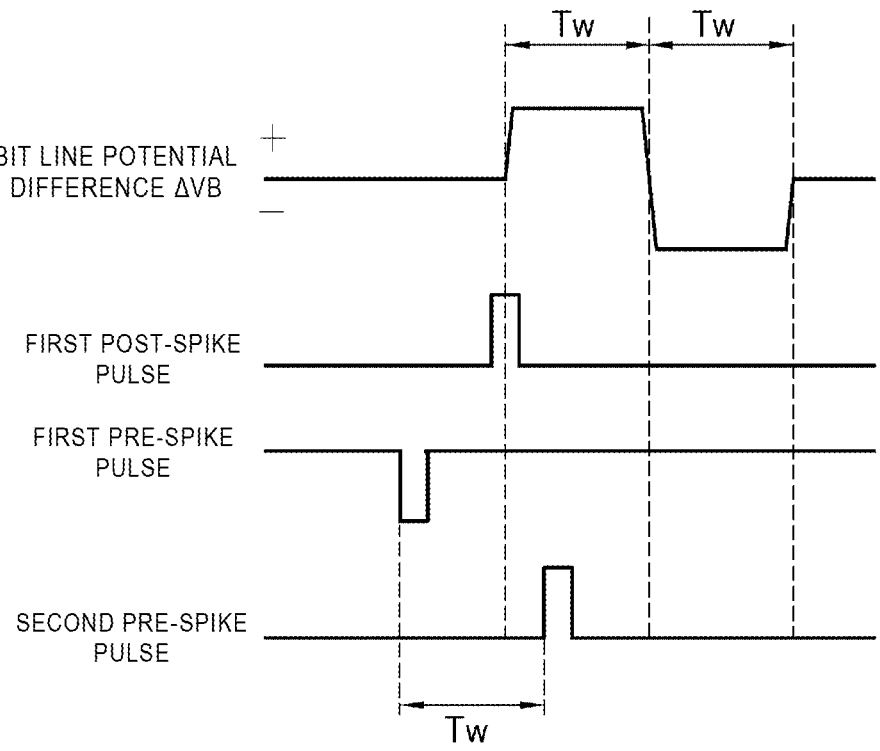
FIG. 12 is a timing chart illustrating various signals in a learning mode in a case where a first pre-spike pulse in a third embodiment precedes.
Figure 13:
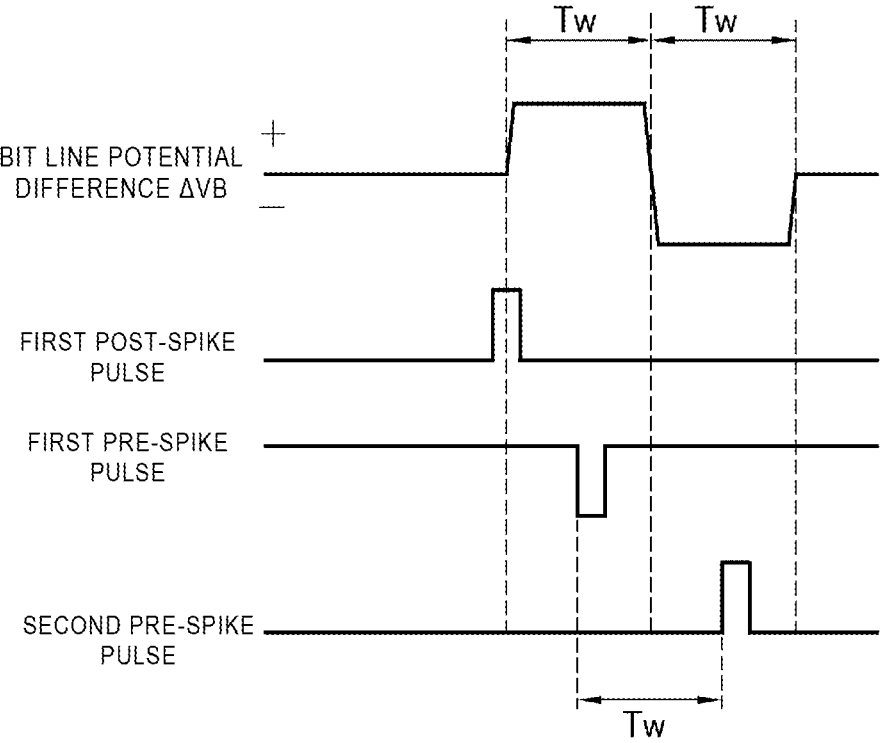
FIG. 13 is a timing chart illustrating various signals in a learning mode in a case where a first post-spike pulse in the third embodiment precedes.

In the third embodiment, as illustrated in FIGS. 12 and 13, the input circuit 20a of the neural network circuit device 60 delays the second pre-spike pulse by the time Tw from the first pre-spike pulse and outputs the second pre-spike pulse. In this example, the second pre-spike pulse has the same pulse width as the first pre-spike pulse. The second pre-spike pulse is a common write pulse in a case where the first pre-spike pulse precedes the first post-spike pulse and in a case where the first post-spike pulse precedes the first pre-spike pulse.

In the learning mode, the bit line driver 19 sets the bit line potential difference ΔVB to be positive in a pulsed manner substantially at the same time as the first post-spike pulse, and after the bit line potential difference ΔVB continues for a period of time Tw, the bit line driver 19 sets the bit line potential difference ΔVB to be negative in a pulsed manner for a period of time Tw. In this example, the pulsed change of the positive bit line potential difference ΔVB is the first time window pulse, and the pulsed change of the negative bit line potential difference ΔVB is the second time window pulse.

In this example, the second pre-spike pulse is output with a delay of time Tw with respect to the first pre-spike pulse, the bit line potential difference ΔVB is positive substantially at the same time as the first post-spike pulse, and the positive bit line potential difference ΔVB continues for the time Tw. For this reason, for example, as illustrated in FIG. 12, in a case where the first pre-spike pulse precedes the first post-spike pulse and the pulse time difference ΔT between the first pre-spike pulse and the first post-spike pulse is within the specified time Tw, the MOS transistors 23 and 24 are turned on by the second pre-spike pulse during a period when the bit line potential difference ΔVB is positive. Therefore, the MTJ element 31 has a high resistance, the MTJ element 33 has a low resistance, and the weight storage unit 64 is in a state where the first coupling weight is stored.

In addition, the second pre-spike pulse is output with a delay of the time Tw from the first pre-spike pulse, the bit line potential difference ΔVB is negative with a delay of the time Tw from the first post-spike pulse, and the negative bit line potential difference ΔVB continues for the time Tw. Therefore, for example, as illustrated in FIG. 13, in a case where the first post-spike pulse precedes the first pre-spike pulse and the pulse time difference ΔT between the first post-spike pulse and the first pre-spike pulse is within the specified time Tw, the MOS transistors 23 and 24 are turned on by the second pre-spike pulse during a period when the bit line potential difference ΔVB is negative. Therefore, the MTJ element 31 has a low resistance, and the MTJ element 33 has a high resistance. As a result, the synapse circuit 11 is in a state where the second coupling weight is stored.

Also according to the third embodiment, the driving of the synapse circuit based on the STDP can be simplified as in the second embodiment. Further, the driving based on the STDP can be implemented with a simple circuit configuration.

Fourth Embodiment

In a fourth embodiment, a synapse circuit is configured with a plurality of weight storage units, and a coupling weight stored in the synapse circuit is changed in a stepwise manner according to a pulse time difference between a first post-spike pulse and a first pre-spike pulse. This embodiment is similar to the third embodiment except for the following detailed description, the substantially same members are denoted by the same reference numerals, and detailed description thereof is omitted.

Figure 14:
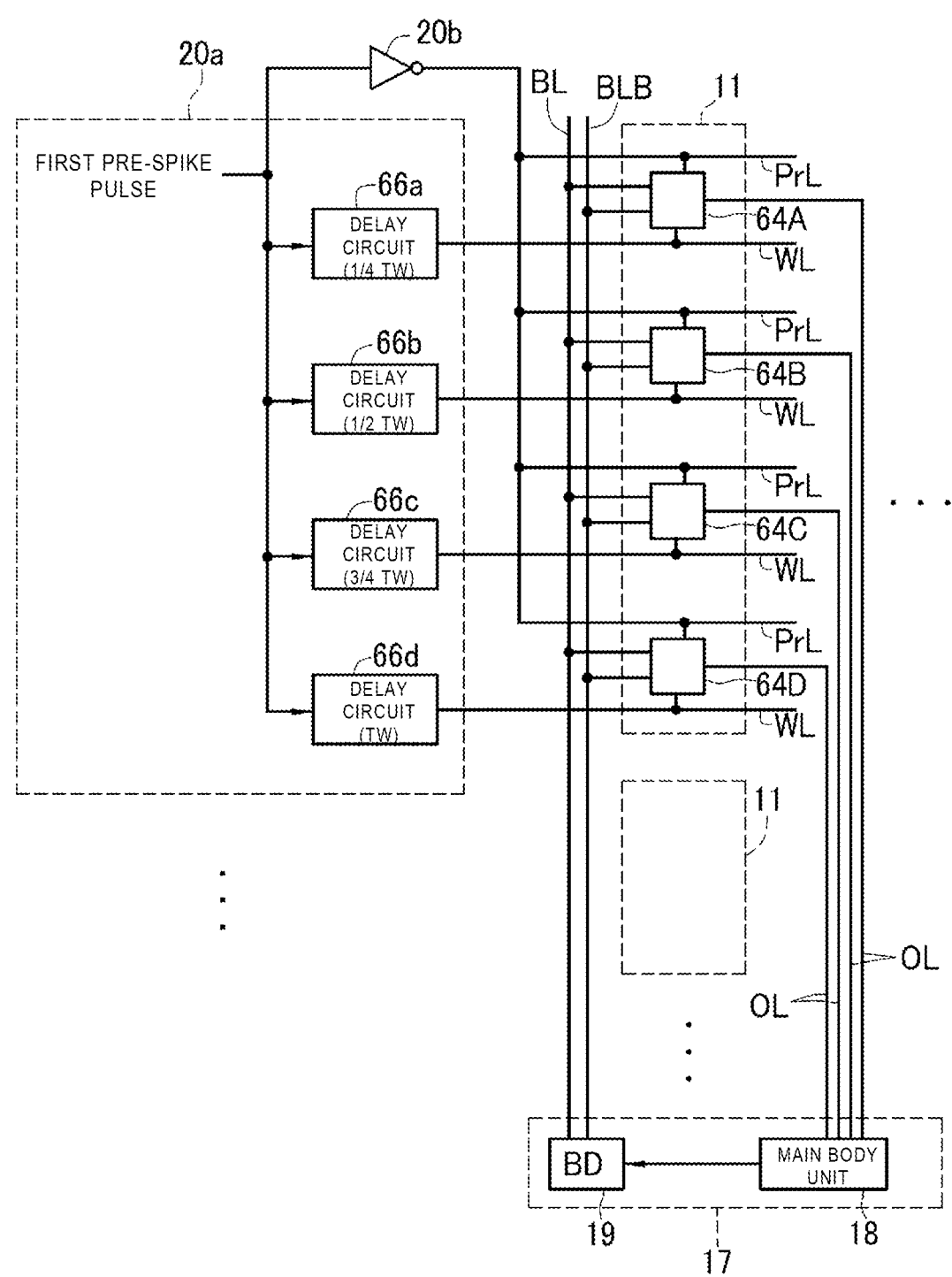
FIG. 14 is a block diagram illustrating a main configuration of a fourth embodiment in which a synapse circuit is configured with a plurality of weight storage units.

In this example, as illustrated in FIG. 14, the synapse circuit 11 includes a plurality of, in this example, four weight storage units 64A to 64D arranged in the column direction. The weight storage units 64A to 64D have the same configuration as the weight storage unit 64 (refer to FIG. 9) of the third embodiment, and are connected to the bit lines BL and BLB, the pre-spike line PrL, the word line WL, and the output line OL in the same manner. The power source line and the source line are connected in the same manner, and the power source line and the source line are omitted in FIG. 14. The weight storage units 64A to 64D are connected to the common bit lines BL and BLB, and connected to pre-spike line PrL and the word line WL in different rows. The output lines OL from the weight storage units 64A to 64D are connected to the neuron circuits 17 in the same column.

The input circuit 20a has delay circuits 66a to 66d corresponding to the weight storage units 64A to 64D of the synapse circuit 11. The delay circuits 66a to 66d are respectively connected to the corresponding weight storage units 64A to 64D via the word lines WL. The first pre-spike pulses are respectively input to the delay circuits 66a to 66d, and the delay circuits 66a to 66d output second to fifth pre-spike pulses (hereinafter, referred to as delayed pre-spike pulses in a case where these pre-spike pulses are not distinguished) in which the input first pre-spike pulses are delayed by a preset delay time to the corresponding word lines WL. In this example, each of the second to fifth pre-spike pulses is a common write pulse.

The delay circuits 66a to 66d are set with different delay times. In this example, the delay time of the delay circuit 66a is ¼ Tw, the delay time of the delay circuit 66b is ½ Tw, the delay time of the delay circuit 66c is ¾ Tw, and the delay time of the delay circuit 66d is Tw. The delay time is set by ¼ Tw step. The delay time can be set appropriately, and for example, the delay time may be set to increase non-linearly (unequal intervals).

Figure 15:
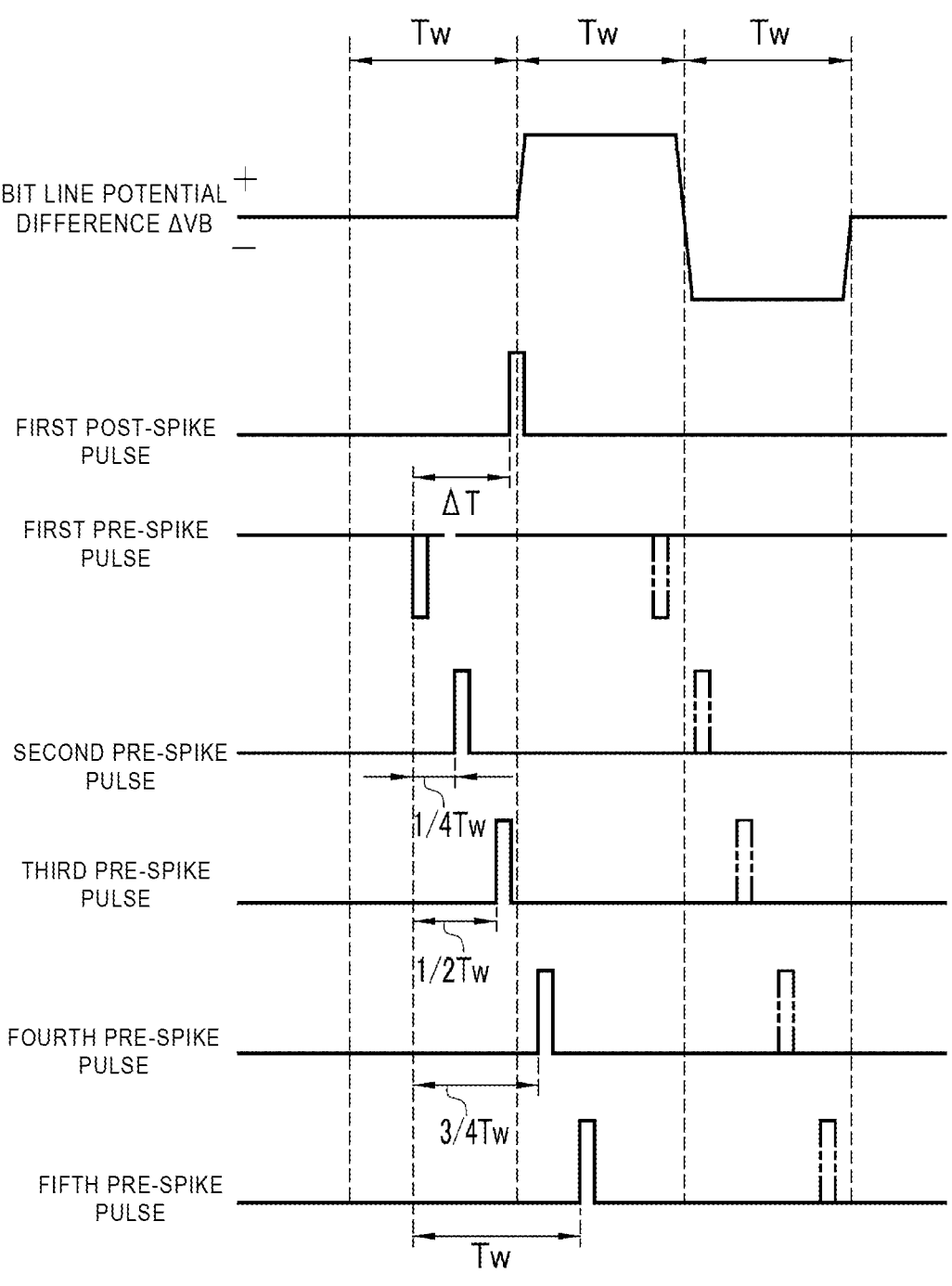
FIG. 15 is a timing chart illustrating various signals in a learning mode in the fourth embodiment.

In the learning mode, as shown in FIG. 15 as an example, with reference to a first pre-spike pulse, a second pre-spike pulse delayed by the delay time of ¼ Tw, a third pre-spike pulse delayed by the delay time of ½ Tw, a fourth pre-spike pulse delayed by the delay time of ¾ Tw, and a fifth pre-spike pulse delayed by the delay time Tw are generated.

The delay time described above is an example, and the delay time can be set appropriately. For example, the delay time may be set to increase nonlinearly (at unequal intervals). Further, a value S may be freely set by setting the value S to an integer of 2 or more and setting the delay time to 1/S·Tw, 2/S·Tw, . . . , (S−1)/S·Tw, Tw.

As described above, the second to fifth pre-spike pulses having different delay times from the first pre-spike pulse, that is, having time differences from each other, are output from the input circuit 20a to the corresponding word line WL. Therefore, the second pre-spike pulse, the third pre-spike pulse, the fourth pre-spike pulse, and the fifth pre-spike pulse are respectively input to the weight storage unit 64A, the weight storage unit 64B, the weight storage unit 64C, and the weight storage unit 64D at different timings.

For example, in a case where the first pre-spike pulse precedes the first post-spike pulse and the pulse time difference ΔT is equal to or less than the time Tw, the number of weight storage units in the synapse circuit 11 to which the second to fifth pre-spike pulses are input during a period when the bit line potential difference ΔVB is positive increases in a stepwise manner. Therefore, in this case, as the pulse time difference ΔT decreases, the number of weight storage units in which the first coupling weight in the synapse circuit 11 is written increases in a stepwise manner.

Specifically, in a range in which the first pre-spike pulse precedes the first post-spike pulse and the pulse time difference ΔT is less than or equal to the time Tw and greater than ¾ Tw, the fifth pre-spike pulse is input to the weight storage unit 64D during a period when the bit line potential difference ΔVB is positive, and the first coupling weight is written in the weight storage unit 64D. However, since the second to fourth pre-spike pulses are input to the weight storage units 64A to 64C before the bit line potential difference ΔVB becomes positive, the coupling weights of the weight storage units 64A to 64C are not rewritten.

As illustrated by a solid line in FIG. 15, in a range in which the first pre-spike pulse precedes the first post-spike pulse and the pulse time difference ΔT is greater than ½ Tw and equal to or less than ¾ Tw, the fourth and fifth pre-spike pulses are input to the weight storage units 64C and 64D during a period when the bit line potential difference ΔVB is positive. Therefore, the first coupling weight is written in the weight storage units 64C and 64D. On the other hand, since the second and third pre-spike pulses are input to the weight storage units 64A to 64B before the bit line potential difference ΔVB becomes positive, the coupling weights of the weight storage units 64A and 64B are not rewritten.

Similarly, in a range in which the pulse time difference ΔT is greater than ¼ Tw and less than or equal to ½ Tw, the first coupling weight is written in the weight storage units 64B to 64D, and the coupling weight in the weight storage unit 64A is not rewritten. Further, in a range in which the pulse time difference ΔT is equal to or less than ¼ Tw, the first coupling weights are written in the weight storage units 64A to 64D.

In a case where the first pre-spike pulse precedes the first post-spike pulse, when the pulse time difference ΔT is greater than the specified time Tw, all of the second to fifth pre-spike pulses are input to the weight storage units 64A to 64D before the bit line potential difference ΔVB becomes positive, so that the coupling weights of the weight storage units 64A to 64D are not rewritten.

On the other hand, in a case where the first post-spike pulse precedes the first pre-spike pulse and the pulse time difference ΔT is equal to or less than the time Tw, as the pulse time difference ΔT becomes large, the number of weight storage units in the synapse circuit 11 to which the second to fifth pre-spike pulses are input during the period when the bit line potential difference ΔVB is negative increases. In this case, as the pulse time difference ΔT increases greatly, during the period when the bit line potential difference ΔVB is positive, the number of weight storage units in the synapse circuit 11 to which the second to fifth pre-spike pulses are input decreases. Therefore, as the pulse time difference ΔT increases, the number of weight storage units in which the first coupling weight is written in the synapse circuit 11 decreases in a stepwise manner, and the number of weight storage units in which the second coupling weight is written increases in a stepwise manner. In FIG. 15, a case where the first post-spike pulse precedes the first pre-spike pulse and the pulse time difference ΔT is larger than ¾ Tw is illustrated by a chain double-dashed line.

In addition, in a range in which the first post-spike pulse precedes the first pre-spike pulse and the pulse time difference ΔT is greater than the specified time Tw and reaches a time 2 Tw, the number of weight storage units in which the second coupling weight is written in the synapse circuit 11 decreases in a stepwise manner, and the number of weight storage units in which the coupling weight is not rewritten increases in a stepwise manner. In a range in which the first post-spike pulse precedes the first pre-spike pulse and the pulse time difference ΔT is greater than the time 2 Tw, the coupling weights of the weight storage units 64A to 64D are not rewritten.

In both the recognition mode and the learning mode, the main body unit 18 of the neuron circuit 17 refers to the sum of the voltage levels of the voltage signals Vpre output from the weight storage units of the synapse circuits 11. Therefore, with attention paid to one synapse circuit 11, the main body unit 18 refers to the sum of the voltage levels of the voltage signals Vpre output from the weight storage units 64A to 64D in the one synapse circuit 11. Therefore, the synapse circuit 11 substantially outputs, to the neuron circuit 17, a weighted pre-spike pulse that is determined by the number of weight storage units in which the first coupling weight is stored and the number of weight storage units in which the second coupling weight is stored. At this time, the weighted pre-spike pulse is weighted to be larger as the number of weight storage units in which the first coupling weight is stored is larger, and is weighted to be smaller as the number of weight storage units in which the second coupling weight is stored is larger, so that the multi-value coupling weight can be stored in the synapse circuit 11.

As described above, according to this example, the number of weight storage units in which the first coupling weight and the second coupling weight are written in the synapse circuit 11 can be changed in a stepwise manner according to an order relationship of the first post-spike pulse and the first pre-spike pulse and the pulse time difference ΔT. In addition, the change mode can be easily changed by adjusting the delay times of the second to fifth pre-spike pulses as the common write pulse.

In the above description, the period when the bit line potential difference ΔVB is positive (hereinafter, referred to as a "first period") and the period when the bit line potential difference ΔVB is negative (hereinafter, referred to as a "second period") have the same length (time length) and are the same as the specified time Tw, but a relationship among the length of the first period, the length of the second period, and the specified time Tw is not limited thereto. For example, the length of the first period may be the same as the specified time and the length of the first period and the specified time may be different from the length of the second period, or the length of the second period may be the same as the specified time, and the length of the second period and the specified time may be different from the length of the first period. Alternatively, the length of the first period may be the same as the length of the second period and the length of the first period and the length of the second period may be different from the specified time Tw, or the length of the first period, the length of the second period and the specified time Tw may be different from each other.

In the above example, the number of weight storage units to which the delayed pre-spike pulses having different delay times are input in one synapse circuit is one, and a part or all of the weight storage units may be plural. In addition, the amount of change in the coupling weight based on the pulse time difference ΔT can be set to be different by changing the number of weight storage units to which the delayed pre-spike pulse is input or the delay time for each delay time of the delayed pre-spike pulse. In this case, for example, the number of weight storage units in one synapse circuit is set to be larger as a delayed pre-spike pulse having a smaller delay time is input. It is also preferable that the number of weight storage units to which the delayed pre-spike pulse of each delay time is input and the delay time can be freely set (programmable), and these number of weight storage units and the delay time are appropriately set in advance to operate the neural network circuit device.

In a circuit configuration in which each row of a plurality of synapse circuits arranged in a matrix is provided with a delay circuit that generates a delayed pre-spike pulse by delaying the first pre-spike pulse by a freely set delay time in the same manner as described above, and a row (delay circuit) assigned to one input circuit can be freely set, the number of weight storage units of each synapse circuit and the delay time can be freely adjusted, and various synapse circuits can be driven based on the STDP.

In each of the above embodiments, in one operation of writing the coupling weight, the write current is allowed to flow once in a pulsed manner to the weight storage unit between a pair of bit lines, but in one operation of writing the coupling weight, the write current may be allowed to flow a plurality of times in a pulsed manner. In the MTJ element that stores the coupling weight, writing may be not correctly performed in a rare case even if the write current flows, but by flowing the write current a plurality of times as described above, it is possible to reliably perform writing of the coupling weight. In this case, the pulses (the first pre-spike pulse, the first post-spike pulse, and the pulsed change in the potential of the bit line) that are input to the synapse circuit and serve as the first write pulse, the second write pulse, and the common write pulse may be a plurality of pulses.

The configuration of the weight storage unit in each of the above embodiments is an example, and the weight storage unit is not particularly limited thereto. The weight storage unit in each of the above embodiments has a configuration in which a pair of inverters each including a MTJ element is cross-coupled, and may also have a circuit configuration using only one MTJ element, for example. The weight storage unit is configured by using a two-terminal type MTJ element of a spin transfer torque (STT) type, and the type of magnetization reversal of the MTJ element, the number of terminals, and the like are not limited thereto. For example, a three-terminal MTJ element of a spin-orbital-torque inversion (SOT) type can be used.

Figure 16:
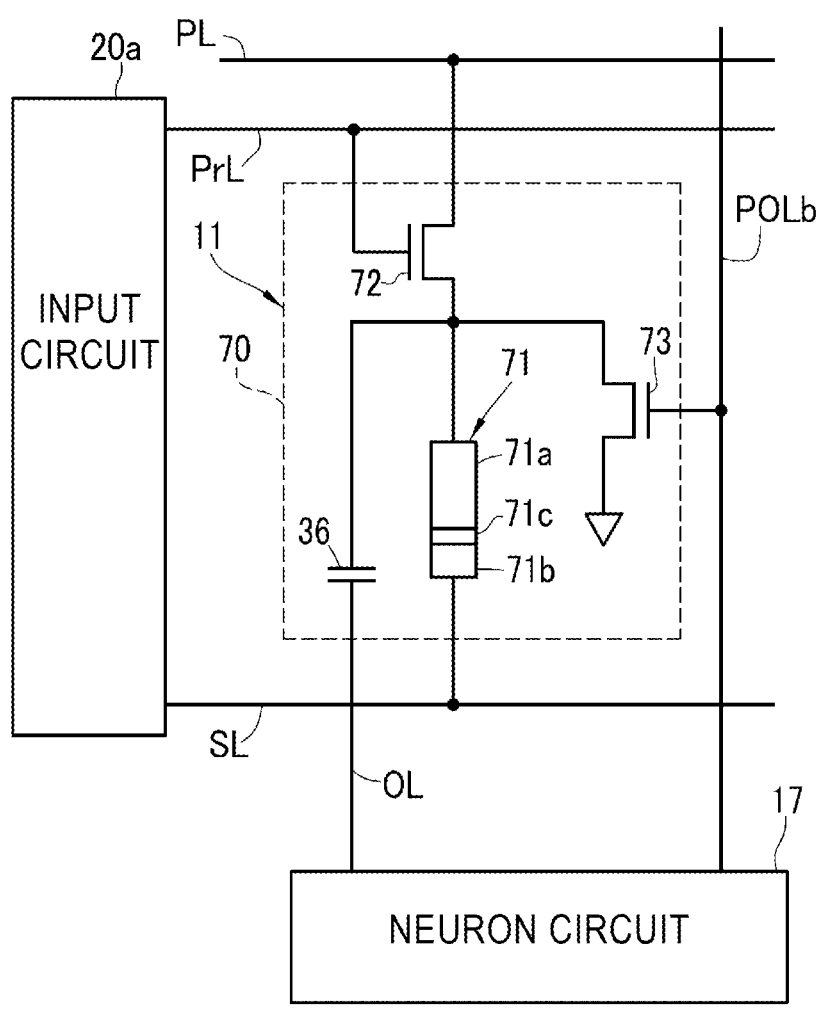
FIG. 16 is a circuit diagram illustrating an example of a weight storage unit using one MTJ element.

A weight storage unit 70 illustrated in FIG. 16 is a configuration example using one MTJ element 71. In the weight storage unit 70, the MTJ element 71 and MOS transistors 72 and 73, which are N-type MOSFETs, are provided. Similarly to the MTJ element of the first embodiment, the MTJ element 71 has a structure in which a magnetization fixed layer 71*a* and a magnetization free layer 71*b* are stacked with an insulating film 71*c* interposed therebetween. The weight storage unit 70 stores the magnitude of the coupling weight according to the magnitude of the resistance of the MTJ element 71 (direction of magnetization of the magnetization free layer 71*b*). In this example, the antiparallel state of the MTJ element 71 is the first coupling weight, and the parallel state is the second coupling weight.

In the MTJ element 71, the magnetization fixed layer 71*a* is connected to the power source line PL via the MOS transistor 72, and the magnetization free layer 71*b* is connected to the source line SL. The gate of the MOS transistor 72 is connected to the pre-spike line PrL, and the connection node between the MTJ element 71 and the MOS transistor 72 is grounded via the MOS transistor 73. The gate of the MOS transistor 73 is connected to the second post-spike line POLb. One electrode of the capacitor 36 is connected to the connection node between the MTJ element 71 and the MOS transistor 72. Therefore, a potential (voltage) corresponding to the resistance value of the MTJ element 71 is output to the output line OL as the voltage signal Vpre via the capacitor 36.

In this example, the first pre-spike pulse is high active. The potential of the source line SL is controlled by the input circuit 20*a*. The potential of the source line SL is set to the ground level (0 V) in the recognition mode. In the learning mode, the potential of the source line SL is usually set to the ground level, and is changed in synchronization with the output of the first pre-spike pulse. Specifically, the potential of the source line SL is set to be positive, that is, higher than the ground level during a period of time Tw from the time point when the first pre-spike pulse falls, and the potential of the source line SL is set to be negative, that is, lower than the ground level during a subsequent period of time Tw. The magnitude (absolute value) of the potential of the source line SL with respect to the ground level at this time is determined such that the write current required for changing the magnetization state of the MTJ element 71 can be allowed to flow in the MTJ element 71.

The second post-spike pulse from the neuron circuit 17 is supplied to the second post-spike line POLb. The second post-spike pulse is delayed by the time Tw from the first post-spike pulse, and is generated in the neuron circuit 17 as having, for example, the same pulse width as the first post-spike pulse. In this example, the first post-spike pulse is not supplied to the synapse circuit 11.

In the learning mode, the input circuit 20a sets the potential of the source line SL to be positive only for the time Tw immediately after outputting the first pre-spike pulse, and sets the potential of the source line SL to be negative during the subsequent period of the time Tw. On the other hand, when the neuron circuit 17 outputs the first post-spike pulse, the neuron circuit 17 outputs the second post-spike pulse with a delay of time Tw from the first post-spike pulse. The MOS transistor 73 is turned on by the second post-spike pulse, and the MTJ element 71 is connected between the source line SL and the ground. Therefore, when the second post-spike pulse is output and the MOS transistor 73 is turned on during a period when the potential of the source line SL is positive or negative, the write current in the direction corresponding to the potential of the source line SL flows in the MTJ element 71.

For example, in a case where the first pre-spike pulse precedes the first post-spike pulse and the pulse time difference ΔT between the first pre-spike pulse and the first post-spike pulse is equal to or less than the time Tw, the second post-spike pulse is input to the weight storage unit 70 when the potential of the source line SL is positive. Therefore, when the MOS transistor 73 is turned on, the write current flows from the source line SL toward the MTJ element 71, and the MTJ element 71 is brought into the antiparallel state. Therefore, the first coupling weight is written in the weight storage unit 70.

On the other hand, in a case where the first post-spike pulse precedes the first pre-spike pulse and the pulse time difference ΔT between the first post-spike pulse and the first pre-spike pulse is equal to or less than the time Tw, the second post-spike pulse is input to the weight storage unit 70 when the potential of the source line is negative. Therefore, when the MOS transistor 73 is turned on, the write current flows from the MTJ element 71 toward the source line SL, and the MTJ element 71 is brought into the parallel state. Therefore, the second coupling weight is written in the weight storage unit 70.

In a case where one of the first post-spike pulse and the first pre-spike pulse precedes the other over the time Tw, the MOS transistor 73 is turned on when the potential of the source line SL is at the ground level, so that the operation of writing the coupling weight is not performed.

Figure 17:
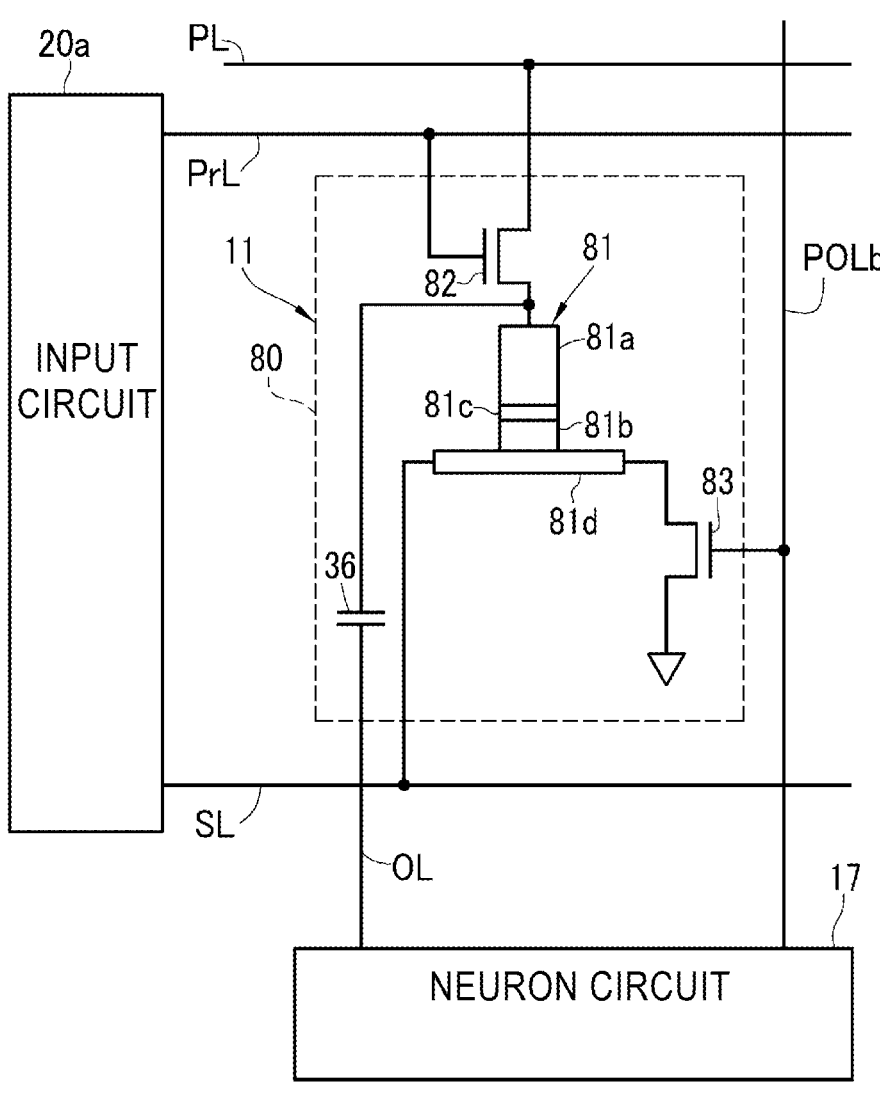
FIG. 17 is a circuit diagram illustrating an example of a weight storage unit using a three-terminal MTJ element.

The weight storage unit 80 illustrated in FIG. 17 has a configuration using a three-terminal MTJ element 81. The MTJ element 81 has a structure in which a stacked body where a magnetization fixed layer 81a and a magnetization free layer 81b are stacked with an insulating film 81c interposed therebetween is provided on a channel layer 81d. The stacked body has, from the channel layer 81d side, the magnetization free layer 81b, the insulating film 81c, and the magnetization fixed layer 81a stacked in this order. The magnetization fixed layer 81a and the magnetization free layer 81b are made of a ferromagnetic material. The insulating film 81c is made of a nonmagnetic insulator. The channel layer 81d is a conductive layer containing an antiferromagnetic material, and is formed in a plate shape extending in one direction. The stacked body is provided at the central portion of one surface of the channel layer 81d.

The magnetization fixed layer 81a has a magnetization direction fixed in one direction, for example, in a direction perpendicular to the film surface (vertical direction in FIG. 17), and the magnetization free layer 81b has an axis of easy magnetization in a direction perpendicular to the film surface, so that the magnetization direction can be changed to any of the parallel state in which the magnetization direction is the same as that of the magnetization fixed layer 81a and the antiparallel state in which the magnetization direction is the opposite direction. The MTJ element 81 can change the magnetization direction of the magnetization free layer 81b by the action of a spin orbital torque generated by allowing the write current to flow in the extending direction of the channel layer 81d, and the magnetization direction of the magnetization free layer 81b can be set to correspond to the direction of the write current. The magnetization directions of the magnetization fixed layer 81a and the magnetization free layer 81b may be parallel to the film surfaces.

The upper surface (the surface opposite to the surface on which the insulating film 81c is formed) of the magnetization fixed layer 81a and one end and the other end in the extending direction of the channel layer 81d are used as terminals, and the MTJ element 81 is connected to the terminals. In the MTJ element 81, the upper surface of the magnetization fixed layer 81a is connected to the power source line PL via the MOS transistor 82, the one end of the channel layer 81d is grounded via the MOS transistor 83, and the other end is connected to the source line SL.

Similarly to the MOS transistors 72 and 73 in the example of FIG. 16, the MOS transistors 82 and 83 are connected to the pre-spike line PrL and the second post-spike line POLb. The control of the potential of the source line SL and the generation timing of the second post-spike pulse are the same as those in the example of FIG. 16.

By applying a read voltage to the stacked body to allow the read current in a direction of passing through the stacked body to flow, the MTJ element 81 can determine the level of the resistance of the MTJ element 81 (stacked body) from the read voltage and the read current. In this example, similarly to the above-described examples, the voltage signal Vpre having a voltage corresponding to the magnetization state (resistance value) of the MTJ element 81 is extracted. Specifically, the potential of the upper surface of the magnetization fixed layer 81a when the MOS transistor 82 is turned on is output to the output line OL as the voltage signal Vpre via the capacitor 36.

In the example of FIG. 17, similarly to the example of FIG. 16, the second post-spike pulse is input to the weight storage unit 80 during the period when the potential of the source line SL is controlled to be positive or negative, so that the direction of the write current flowing through the channel layer 81d is changed. Therefore, when one of the first post-spike pulse and the first pre-spike pulse precedes the other and the pulse time difference between the first post-spike pulse and the first pre-spike pulse is less than or equal to the specified time Tw, the MTJ element 81 is brought into the magnetization state in accordance with the order relationship between the first post-spike pulse and the first pre-spike pulse. As a result, the coupling weight can be written in the synapse circuit 11 in accordance with the order of the first post-spike pulse and the first pre-spike pulse.

In each of the above examples illustrated in FIGS. 16 and 17, the change in the potential of the source line that changes in a pulsed manner higher than the ground level is the first time window pulse, and the change in the potential of the source line that changes in a pulsed manner lower than the ground level is the second time window pulse. The second post-spike pulse is the common write pulse.

As a memory element that stores the coupling weight in a non-volatile manner, the storage element is not limited to the MTJ element. As such a storage element, one that stores data by using a difference in electric resistance can be preferably used. For example, there may be exemplified a phase change element in which data is rewritten by changing the phase state of a phase change material by Joule heat generated when a current is allowed to flow in a phase change material layer, and which is used for a phase change memory (phase change random access memory (PCRAM)), a resistance change element which changes a resistance value of an oxide layer of the weight storage unit by application of a voltage pulse and which is used for a resistive random access memory (resistive RAM (ReRAM)) or the like. In addition, as a memory element that stores a coupling weight in a non-volatile manner, a ferroelectric storage element having a ferroelectric capacitor used in a ferroelectric memory (ferroelectric random access memory) can also be used. Further, other binary non-volatile memory elements, for example, NAND/NOR flash memory elements can also be used.

In the above description, an example in which the coupling weight is stored in a non-volatile manner has been described as the weight storage unit, and the weight storage unit can be used in a volatile circuit configuration in which the coupling weight is stored only while power is supplied, such as an SRAM or a DRAM.

Figure 18:
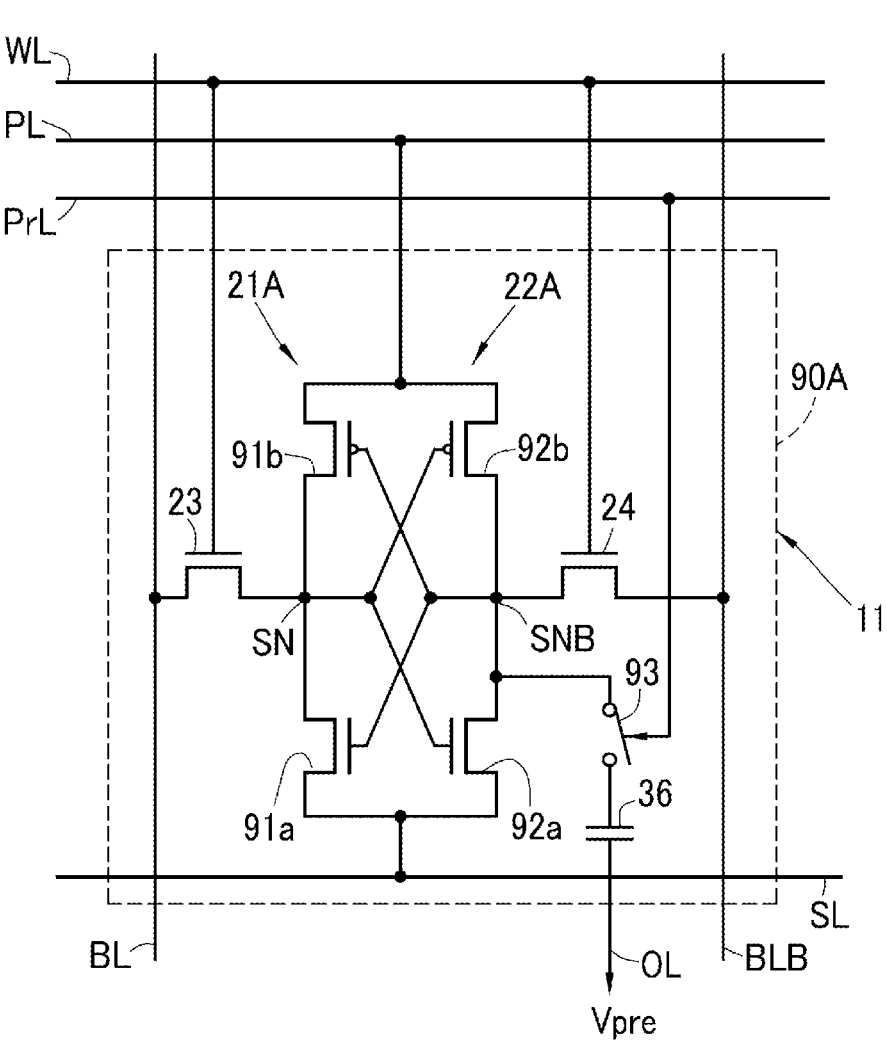
FIG. 18 is a circuit diagram illustrating an example in which a weight storage unit is configured with an SRAM.

A weight storage unit 90A illustrated in FIG. 18 has a circuit configuration similarly to that of an SRAM in which an inverter 21A including a MOS transistor 91a and a MOS transistor 91b connected in series and an inverter 22A including a MOS transistor 92a and a MOS transistor 92b connected in series are cross-coupled. Except for the following detailed description, this embodiment is similar to the second embodiment or the third embodiment.

The MOS transistors 91a and 92a as drive transistors are N-type MOSFETs, and the MOS transistors 91b and 92b as load transistors are P-type MOSFETs. The sources of the MOS transistors 91b and 92b are directly connected to the power source line PL, and the sources of the MOS transistors 91a and 92a are connected to the source line SL. Therefore, the power source is continuously supplied to the inverters 21A and 22A, and the coupling weight is held. The coupling weight is held as a combination of on and off of the MOS transistors 91a and 91b (or the MOS transistors 91b and 92b).

The connection node SN, at which the drains of the MOS transistors 91a and 91b are connected to each other, is connected to the bit line BL via the MOS transistor 23, and is also connected to the gates of the MOS transistors 92a and 92b of the inverter 22A. The connection node SNB, at which the drains of the MOS transistors 92a and 92b are connected to each other, is connected to the bit line BLB via the MOS transistor 24, and is also connected to the gates of the MOS transistors 91a and 92a of the inverter 21A.

In the weight storage unit 90A, as an output circuit unit, a switch unit 93 is provided together with the capacitor 36. The capacitor 36 and the switch unit 93 are connected in series, and one end of the capacitor 36 is connected to the connection node SNB via the switch unit 93. The switch unit 93 is turned on when the first pre-spike pulse is input, and is connected to the pre-spike line PrL. Therefore, in response to the first pre-spike pulse, the voltage signal Vpre corresponding to the coupling weight stored in the weight storage unit 90A is output from the other end of the capacitor 36. It is preferable that the switch unit 93 has a circuit configuration including a circuit having a characteristic close to that of an ideal switch in which the ON resistance is 0Ω when the switch unit 93 is turned on and the OFF resistance is infinite when the switch unit 93 is turned off, for example, a CMOS.

For example, in a case where the MOS transistor 91a is turned off (the MOS transistor 91b is turned on) and the MOS transistor 92a is turned on (the MOS transistor 92b is turned off), the connection node SNB becomes the L level (0 V) and a voltage signal of 0 V is output. On the other hand, in a case where the MOS transistor 91a is turned on (the MOS transistor 91b is turned off) and the MOS transistor 92a is turned off (the MOS transistor 92b is turned on), the connection node SNB becomes the H level, and a relatively high voltage signal is output.

In the learning mode, similarly to the second embodiment or the third embodiment, the weight storage unit 90A generates the second post-spike pulse and switches the potentials of the bit lines BL and BLB to control the writing of the first coupling weight or the second coupling weight. The potentials of the bit lines BL and BLB are changed to a state in which the bit line BL is at the H level and the bit line BLB is at the L level and a state in which the bit line BL is at the L level and the bit line BLB is at the H level, instead of the positive and negative of the bit line potential difference ΔVB. For example, in a case where the first coupling weight is written, the bit line BL is set to the L level and the bit line BLB is set to the H level, and in a case where the second coupling weight is written, the bit line BL is set to the H level and the bit line BLB is set to the L level.

Figure 19:
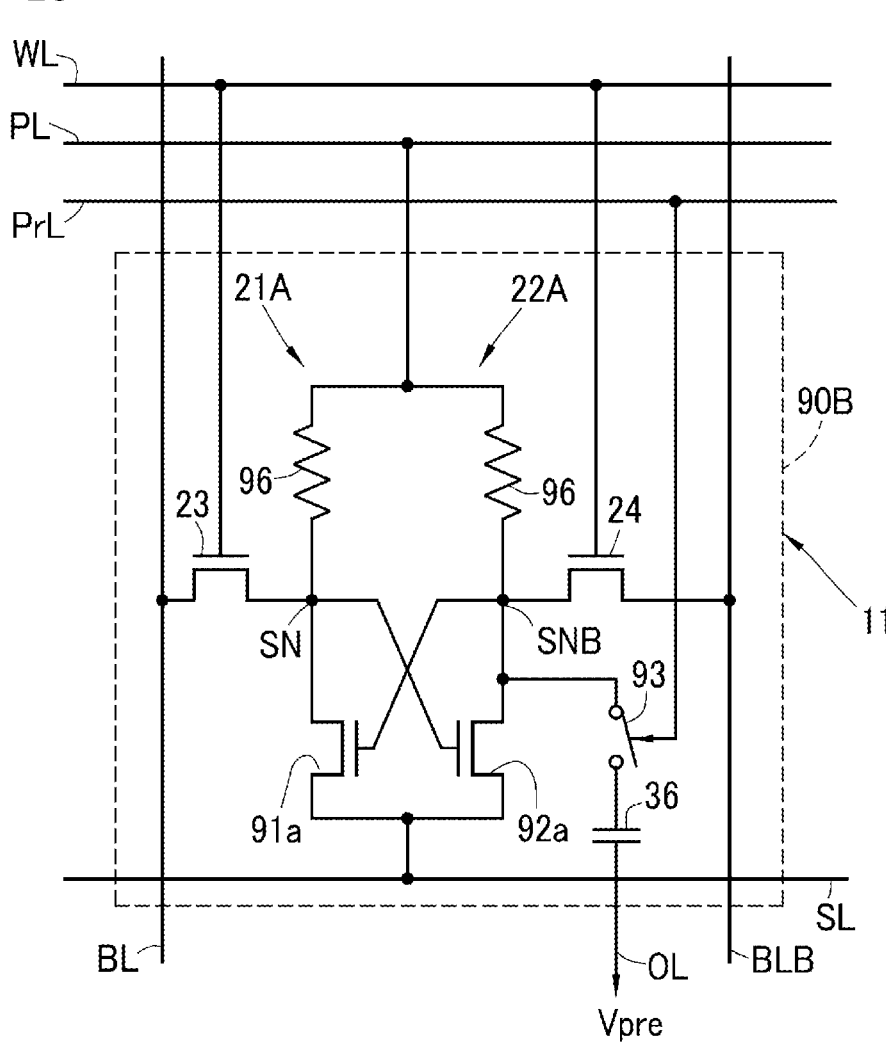
FIG. 19 is a circuit diagram illustrating another example in which the weight storage unit is configured with the SRAM.

In the example of FIG. 18, the load transistors are used, and a resistance element 96 may be used instead of each load transistor as in a weight storage unit 90B illustrated in FIG. 19.

Figure 20:
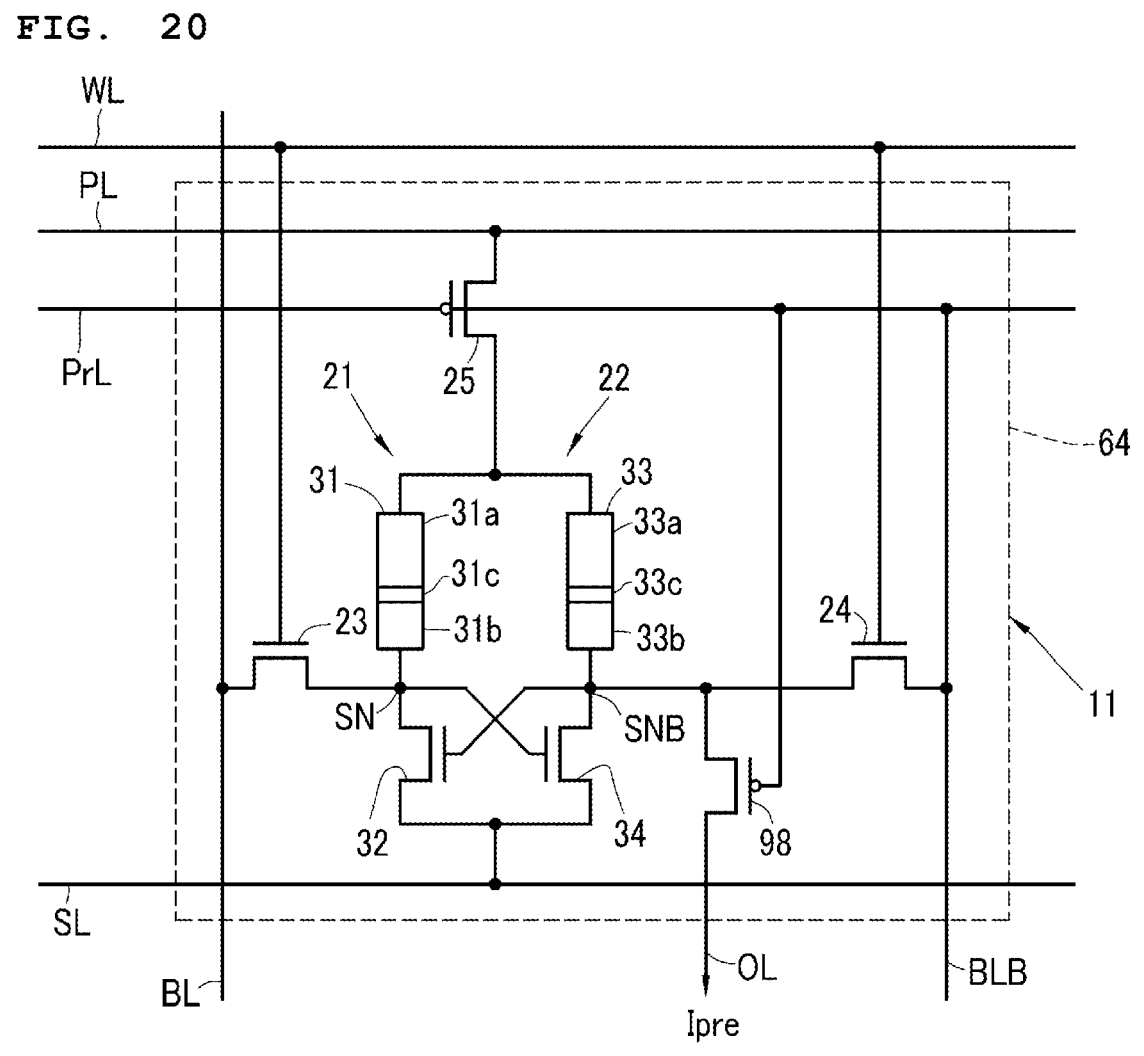

In each of the above examples, an example in which the voltage signal is output as the weighted pre-spike pulse has been described, and the current signal in which the current is increased or decreased according to the coupling weight may be output as the weighted pre-spike pulse. In the example shown in FIG. 20, the output circuit unit of the weight storage unit 64 outputs the current signal as the weighted pre-spike pulse.

The output circuit unit includes a MOS transistor 98 formed of a P-type MOSFET. Therefore, the MOS transistor 98 is provided instead of the capacitor 36 (refer to FIG. 9). The MOS transistor 98 has a source connected to the connection node SNB and a drain connected to the output line OL. The gate of the MOS transistor 98 is connected to the pre-spike line PrL. Therefore, the MOS transistors 25 and 98 are turned on in response to the first pre-spike pulse, so that the current signal Ipre corresponding to the coupling weight stored in the weight storage unit 97 can be output. In a case where the current signal is used, a circuit that integrates a current may be provided in the neuron circuit.

Figure 21:
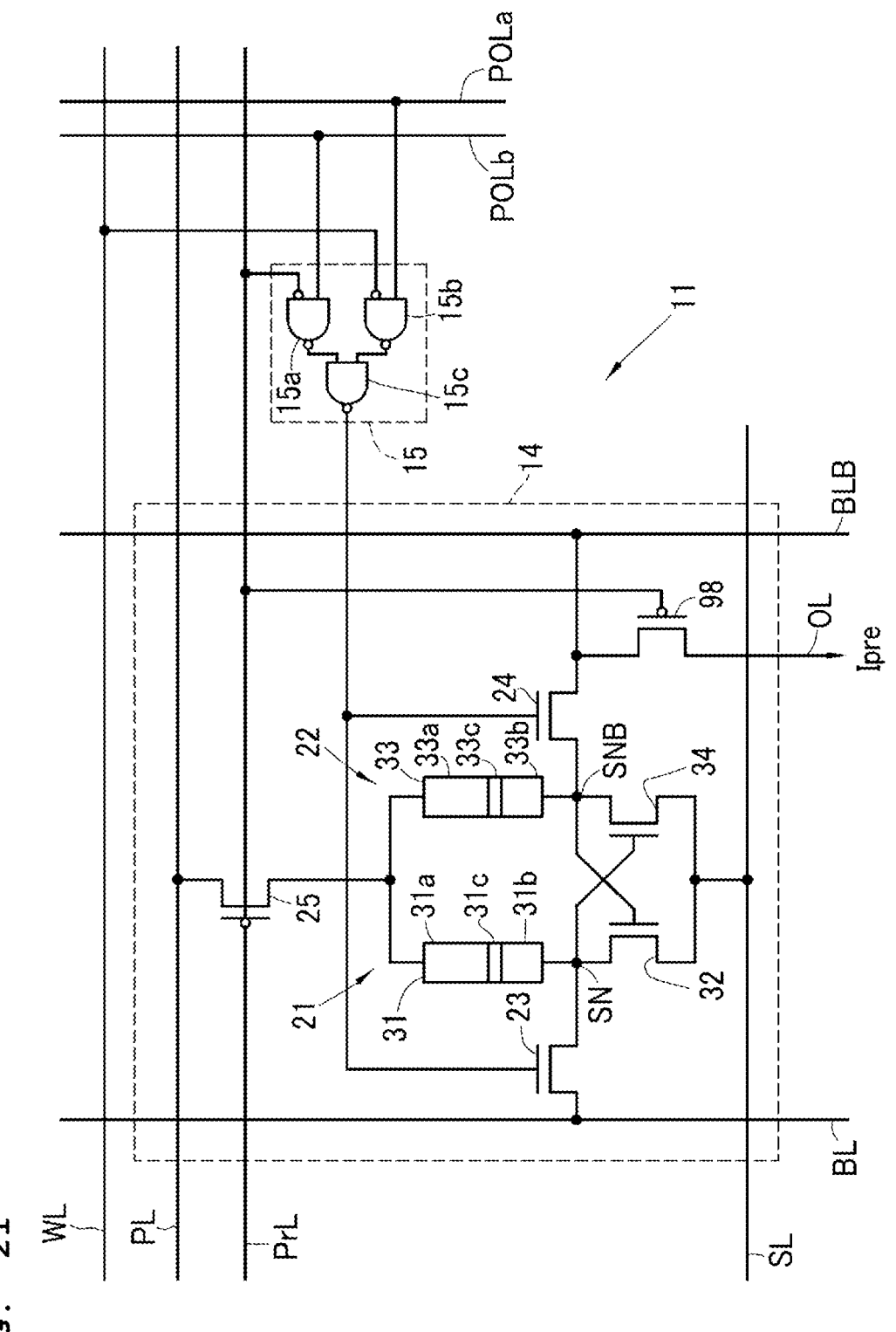
FIG. 21 is a circuit diagram illustrating an example in which the weight storage unit that receives a selection signal outputs the current signal as the weighted pre-spike pulse.
Figure 22:
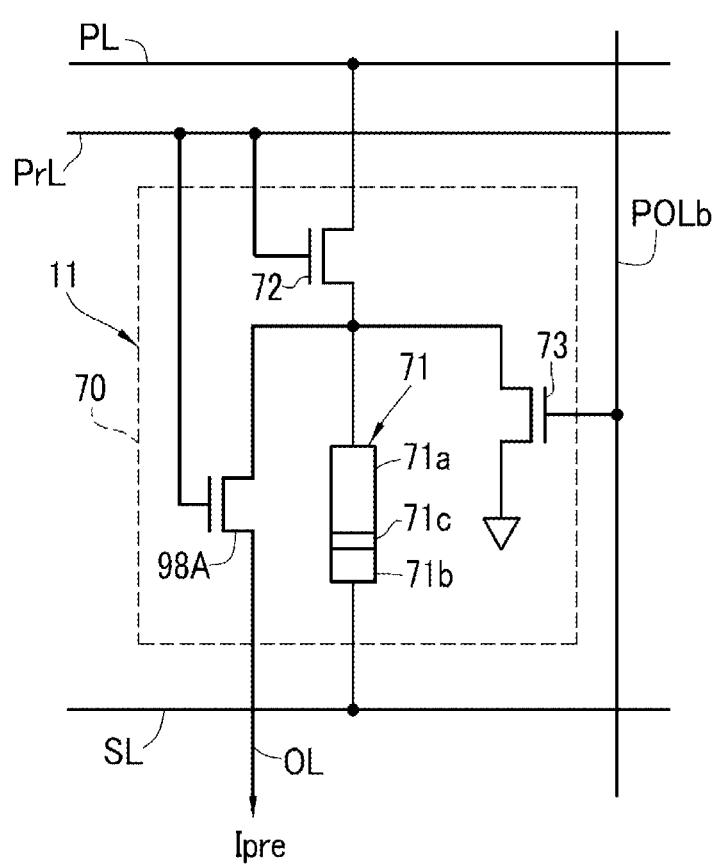
FIG. 22 is a circuit diagram illustrating an example in which the weight storage unit using one MTJ element outputs the current signal as the weighted pre-spike pulse.

Similarly, the current signal can be output as the weighted pre-spike pulse for the other weight storage. In the example illustrated in FIG. 21, the output circuit unit of the weight storage unit 14 outputs the current signal Ipre. Similarly, in the example illustrated in FIG. 22, the output circuit unit of the weight storage unit 70 outputs the current signal Ipre, and in the example illustrated in FIG. 23, the output circuit unit of the weight storage unit 80 outputs the current signal Ipre. In the output circuit units of the weight storage units 70 and 80, since the first pre-spike pulse is high active, a MOS transistor 98A, which is an N-type MOSFET, is used as the output circuit unit. In addition, in the example illustrated in FIG. 24, the output circuit unit of the weight storage unit 90A outputs the current signal Ipre, and in the example illustrated in FIG. 25, the output circuit unit of the weight storage unit 90B outputs the current signal Ipre. The configuration of the output circuit unit can be changed appropriately.

REFERENCE SIGN LIST 10, 60 Neural network circuit device
11 Synapse circuit 14, 64, 64A to 64D, 70, 80, 90A, 90B Weight storage unit
17 Neuron circuit
20a Input circuit
31, 33, 71, and 81 MTJ element
66a to 66d Delay circuit

The invention claimed is:

1. A driving method of a synapse circuit, the synapse circuit comprising a weight storage unit that stores one of a first coupling weight and a second coupling weight as a synaptic coupling weight, the synapse circuit being connected between a pre-neuron circuit and a post-neuron circuit, the synapse circuit being configured to output, to the post-neuron circuit, a weighted pre-spike pulse obtained by weighting a pre-spike pulse input from the pre-neuron circuit with the synaptic coupling weight and write the synaptic coupling weight based on a pulse time difference and an order of the pre-spike pulse and a post-spike pulse, the post-spike pulse is output from the post-neuron circuit, the driving method comprising:

inputting, from one of the pre-neuron circuit and the post-neuron circuit to the synapse circuit, a first time window pulse that defines a first time window that allows writing of the synaptic coupling weight to the weight storage unit in a case where the pre-spike pulse precedes the post-spike pulse, and inputting, from the other one of the pre-neuron circuit and the post-neuron circuit to the synapse circuit, a first write pulse having a pulse width smaller than that of the first time window pulse, the first write pulse being a write timing of writing the synaptic coupling weight of the weight storage unit, inputting, from one of the pre-neuron circuit and the post-neuron circuit to the synapse circuit, a second time window pulse that defines a second time window that allows writing of the synaptic coupling weight to the weight storage unit in a case where the post-spike pulse precedes the pre-spike pulse, and inputting, from the other one of the pre-neuron circuit and the post-neuron circuit to the synapse circuit, a second write pulse having a pulse width smaller than that of the second time window pulse, the second write pulse being a write timing of writing the synaptic coupling weight of the weight storage unit, and performing a write operation by the weight storage unit when the first time window pulse and the first write pulse are simultaneously input to the synapse circuit and when the second time window pulse and the second write pulse are simultaneously input to the synapse circuit.

2. The driving method of the synapse circuit according to claim 1, further comprising:

outputting the second time window pulse from the post-neuron circuit in synchronization with the post-spike pulse, and inputting the post-spike pulse to the synapse circuit as the first write pulse, and outputting the first time window pulse from the pre-neuron circuit in synchronization with the pre-spike pulse, and inputting the pre-spike pulse to the synapse circuit as the second write pulse.

3. The driving method of the synapse circuit according to claim 1, wherein a bit line having a potential corresponding to the synaptic coupling weight written by the post-neuron circuit is connected to the weight storage unit, wherein one common time window pulse that is the first time window pulse and the second time window pulse is output from the pre-neuron circuit in synchronization with the pre-spike pulse, and wherein as the first write pulse, the potential of the bit line is changed by the post-neuron circuit in a pulsed manner to a first potential corresponding to the first coupling weight in synchronization with the post-spike pulse, and after a lapse of a length of a time window defined by the common time window pulse from the change to the first potential, as the second write pulse, the potential of the bit line is changed by the post-neuron circuit in a pulsed manner to a second potential corresponding to the second coupling weight.

4. The driving method of the synapse circuit according to claim 1, wherein a bit line having a potential corresponding to the synaptic coupling weight written by the post-neuron circuit is connected to the weight storage unit, wherein the first time window pulse is input to the synapse circuit by changing, by the post-neuron circuit, the potential of the bit line to a first potential corresponding to the first coupling weight in a pulsed manner in synchronization with the pre-spike pulse, and then the second time window pulse is input to the synapse circuit by changing the potential of the bit line to a second potential corresponding to the second coupling weight in a pulsed manner, and wherein one common write pulse that is the first write pulse and the second write pulse is delayed from the pre-spike pulse and is output from the pre-neuron circuit.

5. The driving method of the synapse circuit according to claim 4, wherein the synapse circuit includes a plurality of the weight storage units, and wherein the common write pulse delayed with different delay times from the pre-spike pulse is input to each of the weight storage units, and the number of the weight storage units in the synapse circuit in which the first coupling weight and the second coupling weight are written is changed based on an order of the post-spike pulse and the pulse time difference.

6. The driving method of the synapse circuit according to claim 5, wherein the number of weight storage units corresponding to each delay time of the common write pulse and each delay time in the synapse circuit is set in advance.

7. The driving method of the synapse circuit according to claim 4, wherein the common write pulse is input to the synapse circuit a plurality of times when the synaptic coupling weight is written to one weight storage unit once.

8. The driving method of the synapse circuit according to claim 1, wherein the first write pulse and the second write pulse are input to the synapse circuit a plurality of times when the synaptic coupling weight is written to one weight storage unit once.

9. The driving method of the synapse circuit according to claim 1, wherein the weight storage unit includes a pair of inverters which are cross-coupled and each of which includes an inverter MOS transistor and a magnetic tunnel junction element which are connected in series, wherein the pair of inverters are operated in response to the input of the pre-spike pulse, and the weighted pre-spike pulse is output based on a potential of an output terminal of one of the pair of inverters, and wherein during the write operation, a write current based on the synaptic coupling weight is allowed to flow through each of the magnetic tunnel junction elements of the pair of inverters, and the magnetic tunnel junction elements are set to different magnetization states.

10. The driving method of the synapse circuit according to claim 1, wherein the weight storage unit stores the synaptic coupling weight in a non-volatile manner according to a magnetization state of a magnetic tunnel junction element, and wherein in response to the input of the pre-spike pulse, a power source line and the magnetic tunnel junction element are connected to each other to output the weighted pre-spike pulse according to the magnetization state.

11. A neural network circuit device comprising:

a pre-neuron circuit configured to output a pre-spike pulse;

a post-neuron circuit configured to output a post-spike pulse;

a synapse circuit including a weight storage unit that stores one of a first coupling weight and a second coupling weight as a synaptic coupling weight, the synapse circuit being connected between the pre-neuron circuit and the post-neuron circuit, the synapse circuit being configured to output, to the post-neuron circuit, a weighted pre-spike pulse obtained by weighting the pre-spike pulse with the synaptic coupling weight and write the synaptic coupling weight based on a pulse time difference and an order of the pre-spike pulse and the post-spike pulse;

a first pulse generator configured to input, to the synapse circuit, a first time window pulse that defines a first time window that allows writing of the synaptic coupling weight to the weight storage unit in a case where the pre-spike pulse precedes the post-spike pulse;

a second pulse generator configured to input, to the synapse circuit, a first write pulse having a pulse width smaller than that of the first time window pulse and being a write timing of writing the synaptic coupling weight of the weight storage unit;

a third pulse generator configured to input, to the synapse circuit, a second time window pulse that defines a second time window that allows writing of the synaptic coupling weight to the weight storage unit in a case where the post-spike pulse precedes the pre-spike pulse; and a fourth pulse generator configured to input, to the synapse circuit, a second write pulse having a pulse width smaller than that of the second time window pulse and being a write timing of writing the synaptic coupling weight of the weight storage unit, wherein one of the pre-neuron circuit and the post-neuron circuit is provided with the first pulse generator, and the other one is provided with the second pulse generator, one of the pre-neuron circuit and the post-neuron circuit is provided with the third pulse generator, and the other one is provided with the fourth pulse generator, and the synapse circuit writes the synaptic coupling weight to the weight storage unit when the first time window pulse and the first write pulse are input at a same time and when the second time window pulse and the second write pulse are input at the same time.

* * * * *